(12) United States Patent
Sugiura et al.

(10) Patent No.: US 7,465,515 B2
(45) Date of Patent: *Dec. 16, 2008

(54) SOLID POLYMER ELECTROLYTE FUEL CELL ASSEMBLY, FUEL CELL STACK, AND METHOD OF OPERATING CELL ASSEMBLY

(75) Inventors: Seiji Sugiura, Utsunomiya (JP); Yoshinori Wariishi, Utsunomiya (JP); Naoyuki Enjoji, Utsunomiya (JP); Narutoshi Sugita, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/093,234

(22) Filed: Mar. 6, 2002

(65) Prior Publication Data

US 2002/0146612 A1  Oct. 10, 2002

(30) Foreign Application Priority Data

Mar. 6, 2001  (JP)  ............................. 2001-061438

(51) Int. Cl.
 *H01M 8/10* (2006.01)
 *H01M 8/24* (2006.01)
(52) U.S. Cl. .............................. 429/39; 429/32; 429/38
(58) Field of Classification Search .................. 429/30, 429/34, 38, 39
 See application file for complete search history.

(56) References Cited

U.S. PATENT DOCUMENTS

| | | | |
|---|---|---|---|
| 5,252,409 A | 10/1993 | Akagi | ......................... 429/32 |
| 5,478,662 A | 12/1995 | Strasser et al. | |
| 5,525,436 A | 6/1996 | Savinell et al. | |
| 6,042,955 A | 3/2000 | Okamoto | |
| 6,048,633 A | 4/2000 | Fujii et al. | |
| 6,083,636 A | 7/2000 | Hsu | |
| 6,277,511 B1 | 8/2001 | Iwase et al. | |
| 6,531,245 B2 * | 3/2003 | Mizuno et al. | ............... 429/129 |
| 6,593,022 B1 * | 7/2003 | McLean | ..................... 429/38 |
| 6,709,781 B2 * | 3/2004 | Suzuki et al. | .................. 429/34 |
| 6,858,338 B2 * | 2/2005 | Sugiura et al. | ................ 429/32 |
| 2002/0146601 A1 * | 10/2002 | Sugiura et al. | ................ 429/13 |

FOREIGN PATENT DOCUMENTS

| | | |
|---|---|---|
| CA | 2299474 | 4/1999 |
| CA | 2295275 | 7/2000 |
| DE | 199 05 564 A1 | 8/2000 |

(Continued)

OTHER PUBLICATIONS

European Search Report Application No. 02004963, dated Sep. 7, 2005.

(Continued)

*Primary Examiner*—John S Maples
(74) *Attorney, Agent, or Firm*—Lahive & Cockfield, LLP; Anthony A. Laurentano, Esq.

(57) ABSTRACT

A cell assembly is formed by stacking a first unit cell and a second unit cell to each other. The first unit cell includes a first unified body, and the second unit cell includes a second unified body. In the cell assembly, the first and second unit cells have structures different from each other.

8 Claims, 20 Drawing Sheets

FOREIGN PATENT DOCUMENTS

| | | | |
|---|---|---|---|
| EP | 0596366 B1 | 5/1994 | |
| EP | 0999605 A2 | 5/2000 | |
| JP | 63 248073 | 10/1988 | |
| JP | 01 151163 | 6/1989 | |
| JP | 04-355061 | * 12/1992 | |
| JP | 04 355061 | 12/1992 | |
| JP | 6-267564 | 9/1994 | |
| JP | 7-320768 | 12/1995 | |
| JP | 07320755 | 12/1995 | |
| JP | 63-298972 | 12/1998 | |
| JP | 11-16590 | 1/1999 | |
| JP | 11-312531 | 11/1999 | |
| JP | 2000-30730 | 1/2000 | |
| JP | 2000-251913 | 9/2000 | |
| RU | 2138885 | 9/1999 | |
| WO | WO-02/071526 A2 | 9/2002 | |

OTHER PUBLICATIONS

Canadian Office Action for Application No. 2,374,542, dated Jul. 17, 2006.

Canadian Office Action for Application No. 2,374,542, dated Apr. 17, 2007.

Japanese Office Action for Application No. 2001-061438, dated Aug. 15, 2006.

Japanese Office Action for Application No. 2001-061438, dated Sep. 9, 2008.

* cited by examiner

SOLID POLYMER ELECTROLYTE FUEL CELL ASSEMBLY, FUEL CELL STACK, AND METHOD OF OPERATING CELL ASSEMBLY

BACKGROUND OF THE INVENTION

1. Field of the Invention

The present invention relates to a solid polymer electrolyte fuel cell assembly including a plurality of unit cells integrally stacked to each other, wherein each of the unit cells has a unified body formed by holding a solid polymer electrolyte membrane between an anode and a cathode, a fuel cell stack obtained by stacking the solid polymer fuel cell assemblies to each other, and a method of operating the solid polymer electrolyte fuel cell assembly.

2. Description of the Related Art

In general, a solid polymer electrolyte fuel cell (PEFC) includes a unit cell (unit power generation cell) formed by disposing an anode and a cathode, each of which is mainly made from carbon, on both sides of an electrolyte membrane of a polymer ion exchange membrane (cation exchange membrane), to form a unified body (membrane-electrode assembly), and holding the unified body between separators (bipolar plates). The solid polymer electrolyte fuel cell is generally used as a fuel cell stack having a specific number of the unit cells.

In the fuel cell of this type, when a fuel gas, for example, a gas mainly containing hydrogen (hereinafter, referred to as "hydrogen containing gas") is supplied to the anode, hydrogen in the hydrogen containing gas is ionized on the catalyst electrode and is migrated to the cathode via the electrolyte; and electrons generated by such electrochemical reaction are taken to an external circuit, to be used as electric energy in the form of a direct current. In this case, since an oxidizing gas, for example, a gas mainly containing oxygen or air (hereinafter, referred to as "oxygen containing gas") is supplied to the cathode, hydrogen ions, electrons and oxygen react with each other to produce water on the cathode.

When a fuel cell stack is used as an on-vehicle power source, a relatively large output is required for the fuel cell stack. To meet such a requirement, a cell structure for making a size of a reaction plane (power generation plane) of a unit cell larger, and a cell structure for stacking a large number of unit cells to each other have been adopted.

The former cell structure, however, has a problem that if the size of each unit cell becomes large, the whole size of the fuel cell stack also becomes large, and such a large-sized fuel cell stack is unsuitable as an on-vehicle power source. Accordingly, the latter cell structure for stacking a large number of relatively compact unit cells to each other has been generally adopted. However, as the number of the stacked unit cells becomes large, the temperature distribution tends to be generated in the stacking direction and also the drainage characteristic of water produced by the electrochemical reaction is degraded, thereby failing to ensure a desired power generation performance.

SUMMARY OF THE INVENTION

To solve the above-described problems, the present invention has been made, and an object of the present invention is to provide a solid polymer electrolyte fuel cell assembly capable of effectively improving the power generation performance of each unit cell and reducing the size of the cell assembly with a simple structure, and a fuel cell stack obtained by stacking the cell assemblies to each other.

Another object of the present invention is to provide a method of operating a solid polymer type fuel assembly, which is capable of making each unit cell effectively generate a power, and improving the drainage characteristic, and the like.

According to the present invention, there is provided a solid polymer electrolyte fuel cell assembly including a plurality of unit cells integrally stacked to each other, each of the plurality of unit cells having a unified body formed by holding a solid polymer electrolyte membrane between an anode and a cathode, characterized in that at least two of the plurality of unit cells have structures different from each other. With this configuration, it is possible to adopt a structure optimum for reaction in each unit cell, and hence to effectively improve the power generation function.

In the above cell assembly, sets of reaction gas passages for allowing at least one kind of a fuel gas and an oxidizing gas as reaction gases to pass therethrough may be provided in at least two of the plurality of unit cells, and the cross-sections of the sets of reaction gas passages be different from each other. With this configuration, it is possible to equalize the reaction on the reaction plane of one unit cell to the reaction on the reaction plane of another unit cell even if the quantity of the reaction gas is consumed by electrochemical reaction.

The cross-sections of the sets of reaction gas passages may be made different from each other by making at least one of the depths, the widths, and the number of one of the sets of reaction gas passages different from that of another of the sets of reaction gas passages. With this configuration, by making the depths of the passages shallow, it is possible to make the unit cells thin, and hence to miniaturize the whole cell assembly. Further, by making the widths of the passages narrow or reducing the number of the passages, it is possible to increase the contact area between adjacent two of the unit cells, and hence to lower the contact resistance.

Sets of reaction gas passages for allowing at least one kind of a fuel gas and an oxidizing gas as reaction gases to pass therethrough may be provided in at least two of the plurality of unit cells, and the lengths of the sets of reaction gas passages be different from each other. With this configuration, since a pressure drop occurs in the unit cell provided with the longer reaction gas passages, it is possible to improve the drainage characteristic of water produced in the unit cell.

Sets of reaction gas passages for allowing at least one kind of a fuel gas and an oxidizing gas as reaction gases to pass therethrough may be provided in at least two of the plurality of unit cells, and the shapes of the sets of reaction gas passages be different from each other. For example, by forming one of the sets of reaction gas passages into a linear shape and forming another of the sets of reaction gas passages into a meandering shape, it is possible to adopt a structure optimum for reaction in each unit cell.

At least two of the plurality of unit cells may include unified bodies different from each other. For example, of the unified bodies provided in the at least two unit cells, one disposed on the downstream side of the flow direction of the reaction gas flowing in the reaction gas passages may be set to be higher in heat resistance than another disposed on the upstream side in the flow direction of the reaction gas. This is because the temperature of the unified body provided on the downstream side in the flow direction of the reaction gas becomes higher than the temperature of the unified body provided on the upstream side in the flow direction of the reaction gas. Concretely, of the unified bodies provided in the at least two unit cells, one disposed on a relatively low temperature side may include a fluorine based membrane, and another disposed on a relatively high temperature side include a hydrocarbon based membrane. With this configuration, since the unified body on the downstream side, which is higher in temperature than the unified body on the upstream side, includes the hydrocarbon based membrane having a high heat resistance, it is possible to improve the useful life thereof.

In the cell assembly, sets of reaction gas passages for allowing at least one kind of a fuel gas and an oxidizing gas as reaction gases to flow in the plurality of unit cells therethrough may be provided in such a manner that at least portions thereof are communicated in series to each other among the unit cells. Here, the wording "at least portions" means at least two or more of the plurality of sets of reaction gas passages, or at least part of each of the sets of reaction gas passages.

With this configuration, it is possible to equalize the humidity in one unit cell to the humidity in another unit cell only by increasing the flow rate of the reaction gas supplied in the cell assembly. This makes it possible to equalize the current density distributions of a plurality of the unit cells to each other and hence to reduce the concentration overpotential. Further, it is possible to effectively discharge water produced in each unit cell only by increasing the flow velocity of the reaction gas supplied in the cell assembly, and hence to improve the drainage characteristic of the whole cell assembly.

According to the present invention, there is provided a fuel cell stack including a plurality of cell assemblies stacked to each other, characterized in that each of the plurality of cell assemblies includes a plurality of unit cells stacked to each other, each of the plurality of unit cells having a unified body formed by holding a solid polymer electrolyte membrane between an anode and a cathode, wherein at least two of the plurality of unit cells have structures different from each other.

According to the present invention, there is provided a method of operating a solid polymer electrolyte fuel cell assembly, characterized in that at least two of the plurality of unit cells are operated under conditions different from each other. Concretely, the temperature of one of the at least two unit cells (on the downstream side in the flow direction of the reaction gas) may be set to be higher than the temperature of another of the at least two unit cells (on the upstream side in the flow direction). A large quantity of water is produced on the downstream side in the flow direction of the reaction gas; however, according to this configuration, since the temperature of the unit cell on the downstream side is raised, the drainage characteristic of the unit cell on the downstream side can be improved.

The flow velocity of the reaction gas flowing in one of the at least two unit cells (on the downstream side in the flow direction of the reaction gas) may be set to be higher than the flow velocity of the reaction gas flowing in another of the at least two unit cells (on the upstream side in the flow direction). With this configuration, it is possible to positively discharge a large quantity of water produced on the downstream side in the flow direction.

The humidity at a reaction gas inlet of one of the at least two unit cells (on the downstream side in the flow direction of the reaction gas) may be set to be lower than the humidity at a reaction gas outlet of another of the at least two unit cells (on the upstream side in the flow direction). With this configuration, it is possible to smoothly discharge water produced on the downstream side in the flow direction.

The utilization ratio of the reaction gas in one of the at least two unit cells (on the downstream side in the flow direction of the reaction gas) may be set to be higher than the utilization ratio of the reaction gas in another of the at least two unit cells (on the upstream side in the flow direction). With this configuration, it is possible to improve the utilization ratio of the reaction gas of the whole cell assembly.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
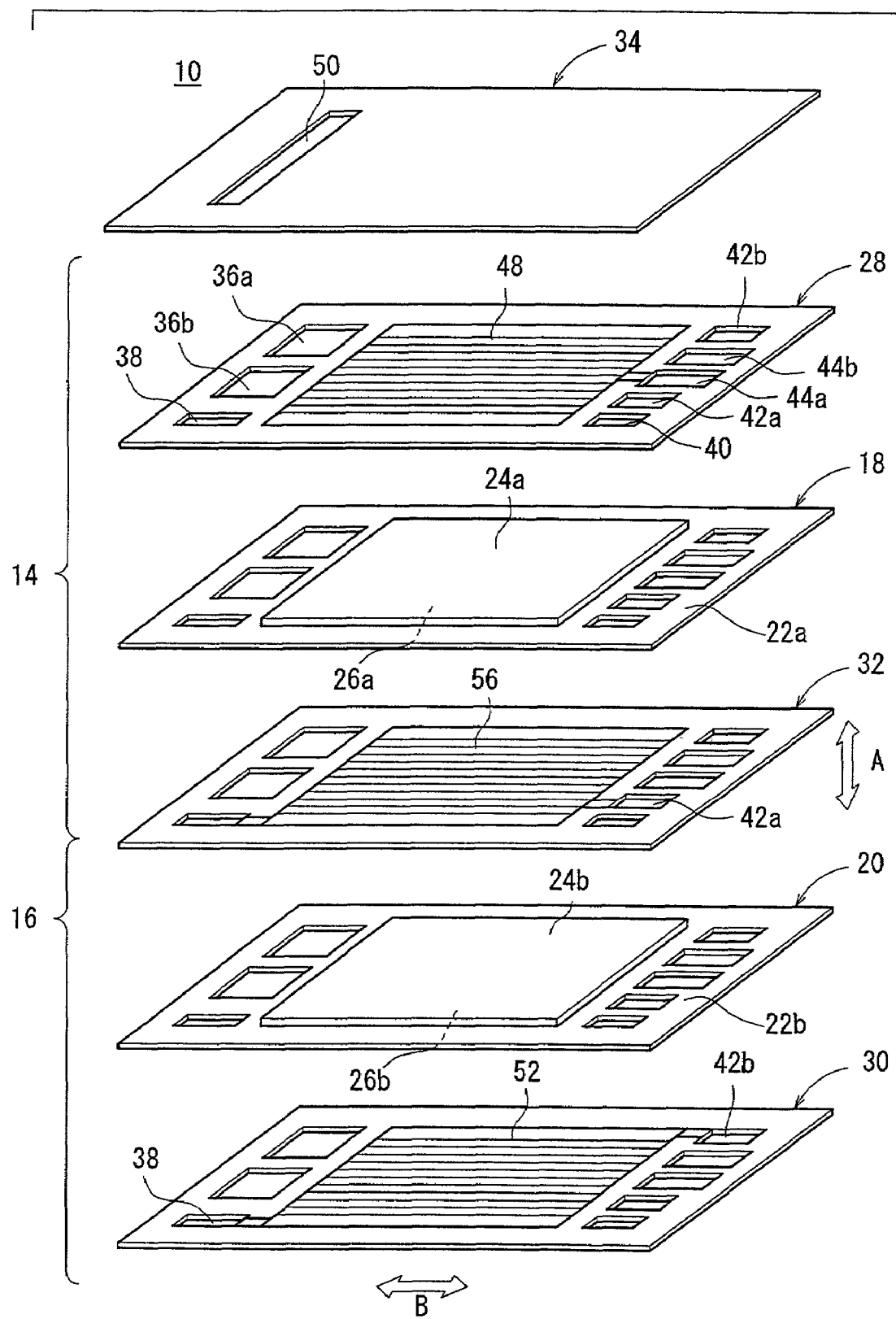
FIG. 1 is an exploded perspective view of an essential portion of a solid polymer electrolyte fuel cell assembly according to a first embodiment of the present invention.
Figure 2:
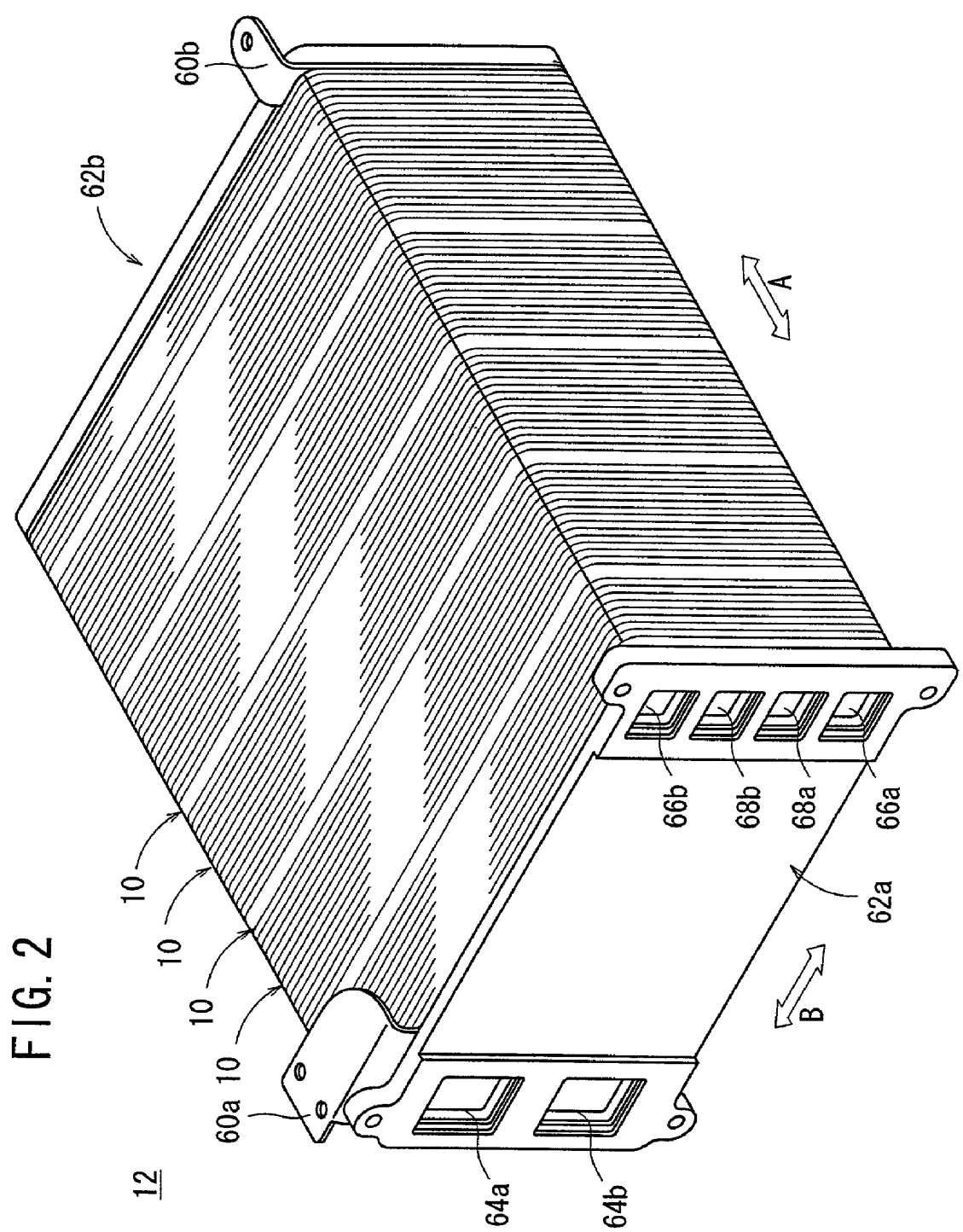
FIG. 2 is a schematic perspective view of a fuel cell stack.

FIG. 1 is an exploded perspective view of an essential portion of a solid polymer electrolyte fuel cell assembly 10 according to a first embodiment of the present invention, and FIG. 2 is a schematic perspective view of a fuel cell stack 12 obtained by stacking a plurality of sets of the cell assemblies 10 to each other.

As shown in FIG. 1, the cell assembly 10 includes a first unit cell 14 and a second unit cell 16, which are stacked to each other. The first unit cell 14 has a first unified body 18, and the second unit cell 16 has a second unified body 20.

The first unified body 18 has a solid polymer electrolyte membrane 22a, and a cathode 24a and an anode 26a which are disposed with the electrolyte membrane 22a put therebetween, and the second unified body 20 has a solid polymer electrolyte membrane 22b, and a cathode 24b and an anode 26b which are disposed with the electrolyte membrane 22b put therebetween. Each of the cathodes 24a and 24b and the anodes 26a and 26b is obtained by forming a noble metal based catalyst electrode layer on a base member mainly made from carbon and forming a porous gas diffusion layer formed of a porous carbon paper or the like.

Figure 3:
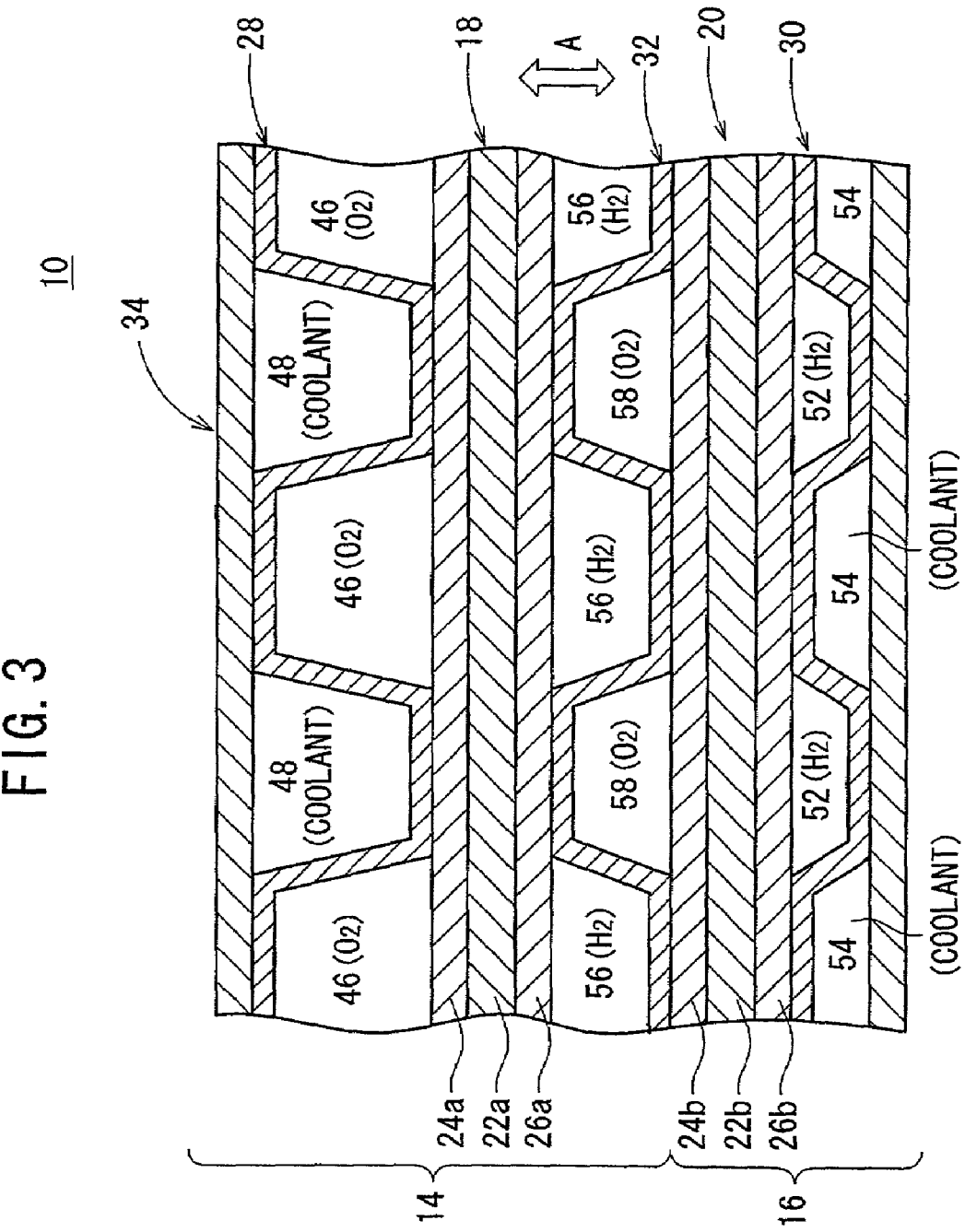
FIG. 3 is an illustrative sectional view of an essential portion of the cell assembly.

As shown in FIGS. 1 and 3, a first separator 28 is disposed on the cathode 24a side of the first unified body 18, and a second separator 30 is disposed on the anode 26b side of the second unified body 20. An intermediate separator 32 is disposed between the first and second unified bodies 18 and 20. A thin wall plate (partition wall member) 34 is provided on the outer surface side of each of the first and second separators 28 and 30.

As shown in FIG. 1, each of the first and second unified bodies 18 and 20, the first and second separators 28 and 30, and the intermediate separator 32 has, at one edge portion in the long-side direction, an oxidizing gas inlet 36a, an oxidizing gas outlet 36b, and a fuel gas intermediate communication hole 38. Each of the oxidizing gas inlet 36a and the oxidizing gas outlet 36b allows an oxidizing gas (reaction gas) such as an oxygen containing gas or air to pass through. The fuel gas intermediate communication hole 38 allows a fuel gas (reaction gas) such as a hydrogen containing gas to pass therethrough. The oxidizing gas inlets 36a (oxidizing gas outlets 36b, and fuel gas intermediate communication holes 38) provided in the cell components 18, 20, 28, 30, and 32 are communicated to each other in the stacking direction (shown by an arrow A) of the first and second unit cells 14 and 16.

Each of the first and second unified bodies 18 and 20, the first and second separators 28 and 30, and the intermediate separator 32 has, at the other edge portion in the long-side direction, an oxidizing gas intermediate communication hole 40, a fuel gas inlet 42a, a fuel gas outlet 42b, a coolant inlet 44a, and a coolant outlet 44b. The oxidizing gas intermediate communication hole 40 allows an oxidizing gas to pass therethrough. Each of the fuel gas inlet 42a and the fuel gas outlet 42b allows a fuel gas to pass therethrough. Each of the coolant inlet 44a and the coolant outlet 44b allows a coolant to pass therethrough. The oxidizing gas intermediate communication holes 40 (fuel gas inlets 42a, fuel gas outlets 42b, coolant inlets 44a, and coolant outlets 44b) provided in the cell components 18, 20, 28, 30, and 32 are communicated to each other in the direction A.

Figure 4:
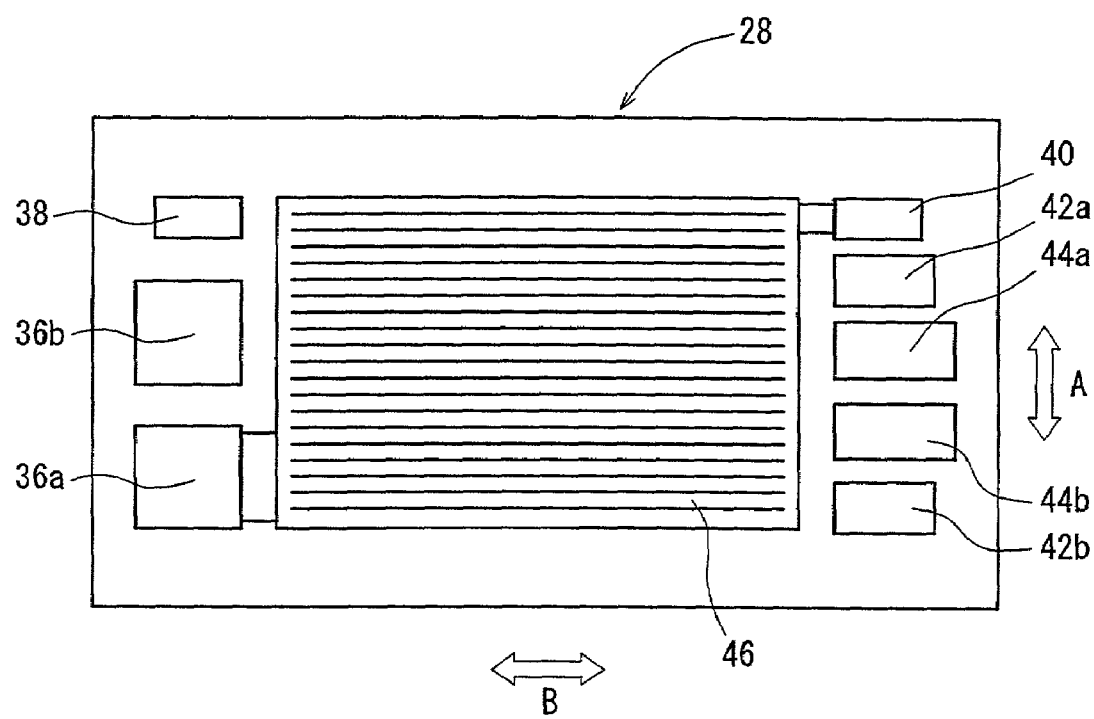
FIG. 4 is a front view of a first separator of the cell assembly.

The first separator 28 is configured as a metal sheet. A portion, facing to a reaction plane (power generation plane) of the first unified body 18, of the metal sheet is formed into a shape of projections and depressions, for example, into a corrugated shape. To be more specific, as shown in FIGS. 3 and 4, the first separator 28 has, on the surface side facing to the cathode 24a of the first unified body 18, a plurality of oxidizing gas passages (reaction gas passages) 46. The oxidizing gas passages 46 linearly extend in the long-side direction (shown by an arrow B). The one-ends of the oxidizing gas passages 46 are communicated to the oxidizing gas inlet 36a and the other ends thereof are communicated to the oxidizing gas intermediate communication hole 40.

As shown in FIGS. 1 and 3, the first separator 28 also has, on the surface side facing to one surface of the wall plate 34, a plurality of coolant passages 48. The coolant passages 48 linearly extend in the long-side direction (shown by the arrow B). The one-ends of the coolant passages 48 are communicated to the coolant inlet 44a, and the other ends thereof are communicated to the coolant outlet 44b by way of the other surface side of the wall plate 34 via a hole portion 50 as an intermediate return portion formed in the wall plate 34 or in a separate member.

The second separator 30 is configured as being substantially similar to the first separator 28. The second separator 30 has, on the surface side facing to the anode 26b of the second unified body 20, a plurality of fuel gas passages (reaction gas passages) 52. The fuel gas passages 52 linearly extend in the long-side direction (shown by the arrow B). The one-ends of the fuel gas passages 52 are communicated to the fuel gas intermediate communication hole 38 and the other ends thereof are communicated to the fuel gas outlet 42b. The second separator 30 also has, on the surface side facing to the wall plate 34 of the adjacent cell assembly 10, a plurality of coolant passages 54. The coolant passages 54 linearly extend in the long-side direction (shown by the arrow B), with their terminals communicated to the coolant outlet 44b.

The intermediate separator 32 is configured as being substantially similar to each of the first and second separators 28 and 30. The intermediate separator 32 has, on the surface side facing to the anode 26a of the first unified body 18, a plurality of fuel gas passages (reaction gas passages) 56. The fuel gas passages 56 linearly extend in the long-side direction (shown by the arrow B). The one-ends of the fuel gas passages 56 are communicated to the fuel gas inlet 42a and the other ends thereof are communicated the fuel gas intermediate communication hole 38.

As shown in FIG. 3, the intermediate separator 32 also has, on the surface side facing to the cathode 24b of the second unified body 20, a plurality of oxidizing gas passages (reaction gas passages) 58. The oxidizing gas passages 58 linearly extend in the long-side direction (shown by the arrow B). The one-ends of the oxidizing gas passages 58 are communicated to the oxidizing gas intermediate communication hole 40 and the other ends thereof are communicated to the oxidizing gas outlet 36b.

With respect to the oxidizing gas passages 46 and 58 provided in series in the first and second unit cells 14 and 16, the cross-sections of the oxidizing gas passages 46 are different from those of the oxidizing gas passages 58. With respect to the fuel gas passages 56 and 52 provided in series in the first and second unit cells 14 and 16, the cross-sections of the fuel gas passages 56 are different from those of the fuel gas passages 52. To be more specific, as shown in FIG. 3, the cross-section of each oxidizing gas passage 58 on the outlet side is smaller than that of each oxidizing gas passage 46 on the inlet side, and the cross-section of each fuel gas passage 52 on the outlet side is smaller than that of each fuel gas passage 56 on the inlet side.

A specific number of sets of the cell assemblies 10 configured as described above are, as shown in FIG. 2, are stacked to each other in the direction A with fixing means (not shown).

End plates 62a and 62b are disposed, via current collecting electrodes 60a and 60b, on both ends of the sets of the cell assemblies 10 in the direction A, and are fastened with tie rods (not shown) or the like. A fuel cell stack 12 is thus obtained.

The end plate 62a has, at one edge portion in the long-side direction, an oxidizing gas supply port 64a communicated to the oxidizing gas inlets 36a, an oxidizing gas discharge port 64b communicated to the oxidizing gas outlets 36b. The end plate 62a also has, on the other edge portion in the long-side direction, a fuel gas supply port 66a communicated to the fuel gas inlets 42a, a fuel gas discharge port 66b communicated to the fuel gas outlets 42b, a coolant supply port 68a communicated to the coolant inlets 44a, and a coolant discharge port 68b communicated to the coolant outlets 44b.

The operations of the fuel cell stack 12 and the cell assembly 10 configured as described above will be described below.

In the fuel cell stack 12, a fuel gas such as a hydrogen containing gas is supplied from the fuel gas supply port 66a; an oxidizing gas such as air or an oxygen containing gas is supplied from the oxidizing gas supply port 64a; and a coolant such as pure water, ethylene glycol, or oil is supplied from the coolant supply port 68a. Accordingly, the fuel gas, oxidizing gas, and coolant are sequentially supplied to the plurality of cell assemblies 10 stacked to each other in the direction A.

Figure 5:
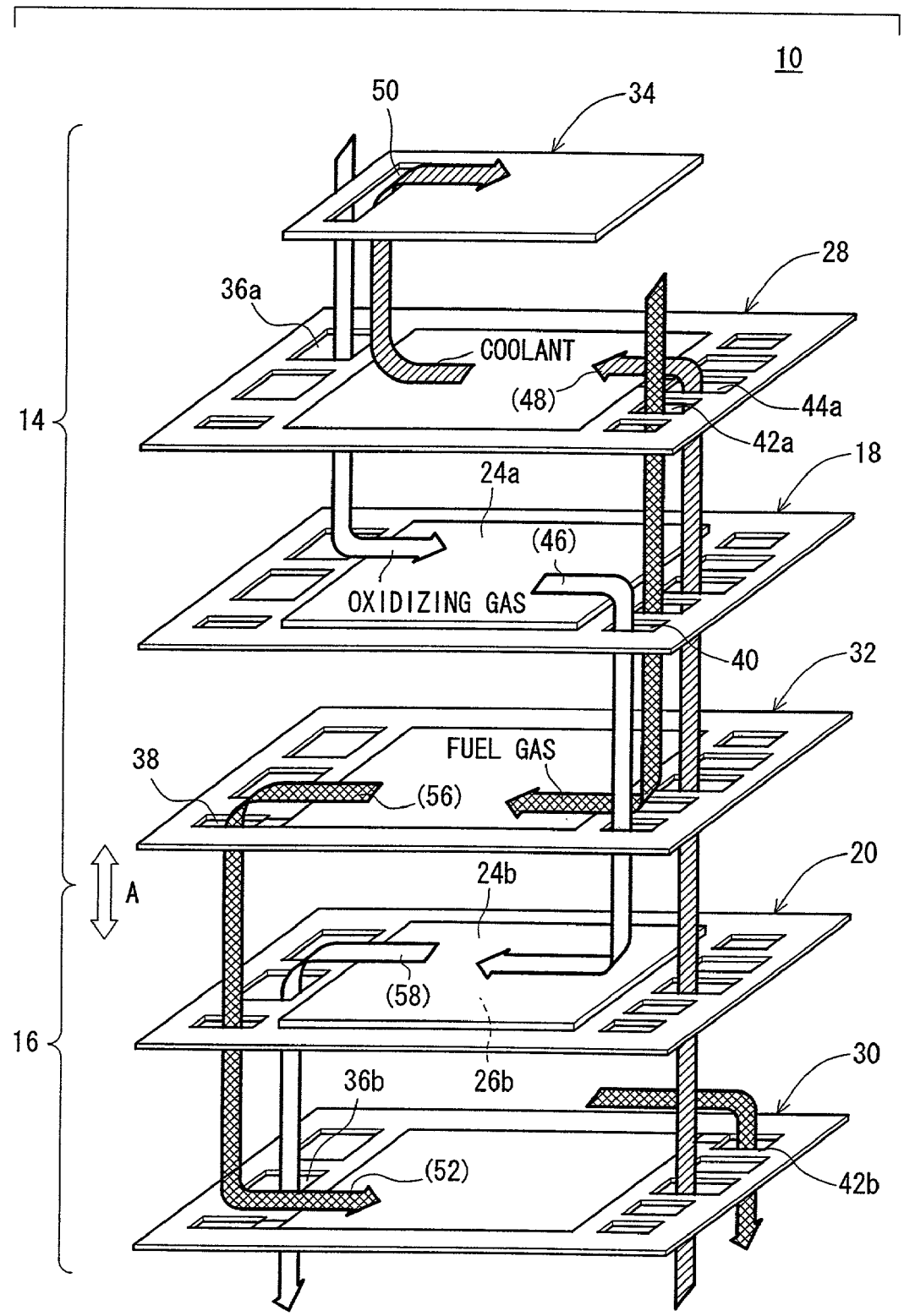
FIG. 5 is a view showing flows of an oxidizing gas, a fuel gas, and a coolant in the cell assembly.

As shown in FIG. 5, the oxidizing gas supplied to the oxidizing gas inlets 36a communicated to each other in the direction A is introduced in the plurality of oxidizing gas passages 46 provided in the first separator 28 and is moved along the cathode 24a of the first unified body 18. Meanwhile, the fuel gas supplied to the fuel gas inlets 42a communicated to each other in the direction A is introduced in the plurality of fuel gas passages 56 provided in the intermediate separator 32 and is moved along the anode 26a of the first unified body 18. In the first unified body 18, the oxidizing gas supplied to the cathode 24a and the fuel gas supplied to the anode 26a are thus consumed by electrochemical reaction in the catalyst layers, to result in power generation.

The oxidizing gas, part of which has been consumed in the first unified body 18, is introduced from the oxidizing gas passages 46 into the oxidizing gas intermediate communication hole 40 of the first unified body 18, being moved in the direction A through the oxidizing gas intermediate communication holes 40 of the first unified body 18 and the intermediate separator 32, and is introduced in the oxidizing gas passages 58 provided in the intermediate separator 32. The oxidizing gas thus introduced in the oxidizing gas passages 58 is then moved along the cathode 24b of the second unified body 20.

Similarly, the fuel gas, part of which has been consumed in the anode 26a of the first unified body 18, is introduced into the fuel gas intermediate communication hole 38 of the intermediate separator 32, being moved in the direction A through the fuel gas intermediate communication holes 38 of the intermediate separator 32 and the second unified body 20, and is introduced in the fuel gas passages 52 provided in the second separator 30. The fuel gas thus introduced in the fuel gas passages 52 is then moved along the anode 26b of the second unified body 20. In the second unified body 20, the oxidizing gas and the fuel gas are thus consumed by electrochemical reaction in the catalyst layers, to result in power generation. The oxidizing gas, whose oxygen has been consumed, is discharged into the oxygen gas outlet 36b of the second separator 30, whereas the fuel gas, whose hydrogen has been consumed, is discharged into the fuel gas outlet 42b of the second separator 30.

On the other hand, the coolant supplied to the coolant inlet 44a of the first separator 28 is moved along the coolant passages 48 provided in the first separator 28, being returned from the hole portion 50 formed in the wall plate 34 and moved along the coolant passages 54 provided in the second separator 30 of the adjacent cell assembly 10, and is discharged into the coolant outlet 44b of the second separator 30.

According to the first embodiment, the cross-section of each oxidizing gas passage 46 is different from that of each oxidizing gas passage 58, whereas the cross-section of each fuel gas passage 56 is different from that of each fuel gas passage 52. To be more specific, as shown in FIG. 3, the cross-section of the oxidizing gas passage 58 on the outlet side is smaller than that of the oxidizing gas passage 46 on the inlet side, whereas the cross-section of the fuel gas passage 52 on the outlet side is smaller than that of the fuel gas passage 56 on the inlet side. Along with movement of each of the oxidizing gas and the fuel gas to the outlet side, the amount of the gas is reduced by consumption due to electrochemical reaction. According to the first embodiment, however, since the cross-sections of the oxidizing gas passages 58 and the fuel gas passages 52 on the outlet side are respectively smaller than those of the oxidizing gas passages 46 and the fuel gas passages 56 on the inlet side, the reaction on the reaction plane of the second unified body 20 can be equalized to the reaction on the reaction plane of the first unified body 18.

The cross-sections of the oxidizing gas passages 46 can be made different from those of the oxidizing gas passages 58 by changing the depths, the widths, or the number of the passages 46 and 58, and similarly, the cross-sections of the fuel gas passages 56 can be made different from those of the fuel gas passages 52 by changing the depths, the widths, or the number of the passages 56 and 52.

Figure 6:
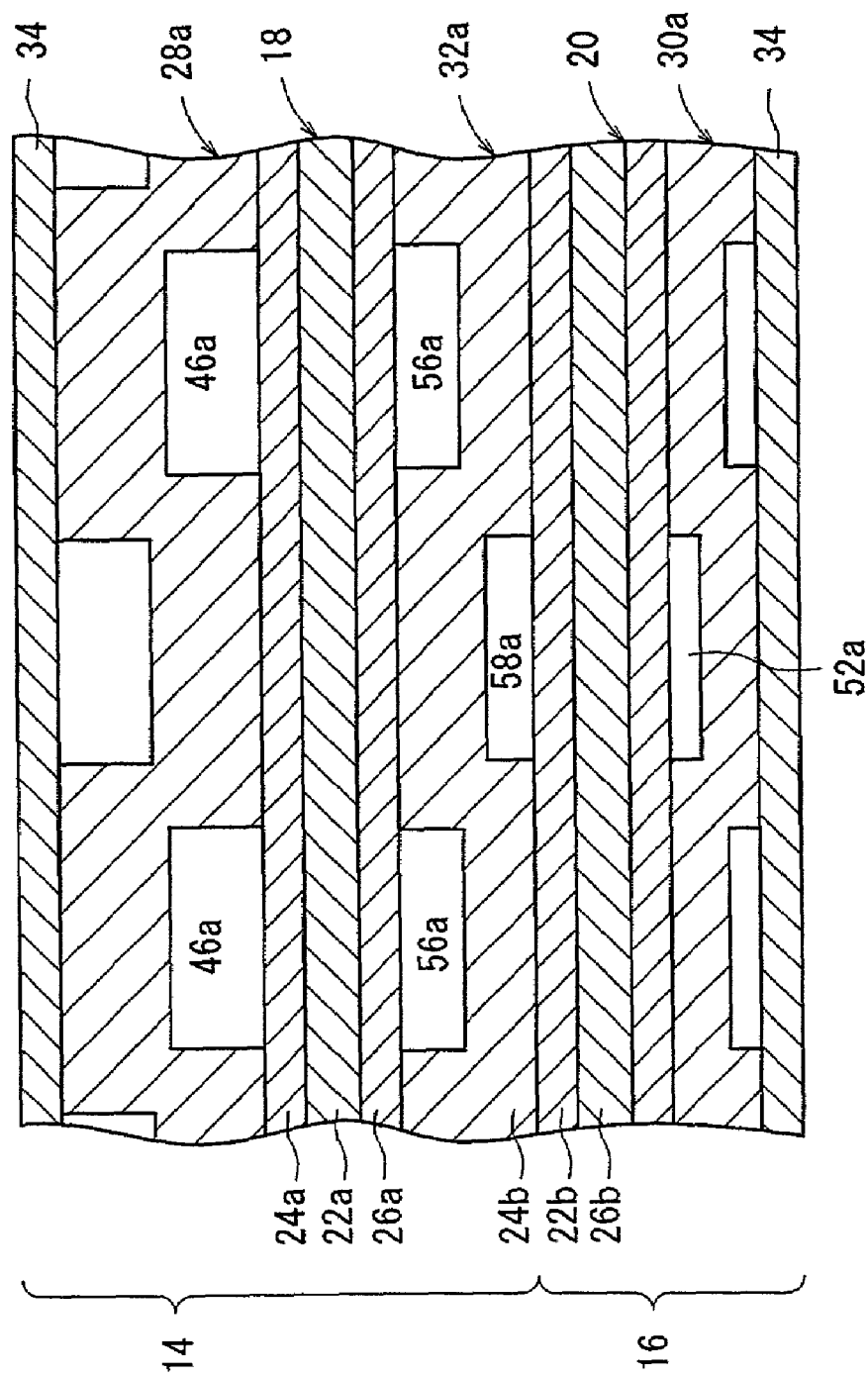
FIG. 6 is a view illustrating a manner of making cross-sections of passages different from each other by making the depths of the passages different from each other.

In an example shown in FIG. 6, the depth of each oxidizing gas passage 58a provided in a plate-like intermediate separator 32a is set to be shallower than the depth of each oxidizing gas passage 46a provided in a plate-like first separator 28a, whereas the depth of each fuel gas passage 52a provided in a plate-like second separator 30a is set to be shallower than the depth of each fuel gas passage 56a provided in the plate-like intermediate separator 32a. With this configuration, it is possible to obtain an additional effect of making each of the first and second unit cells 14 and 16 thin, thereby easily miniaturizing the whole cell assembly 10.

Figure 7:
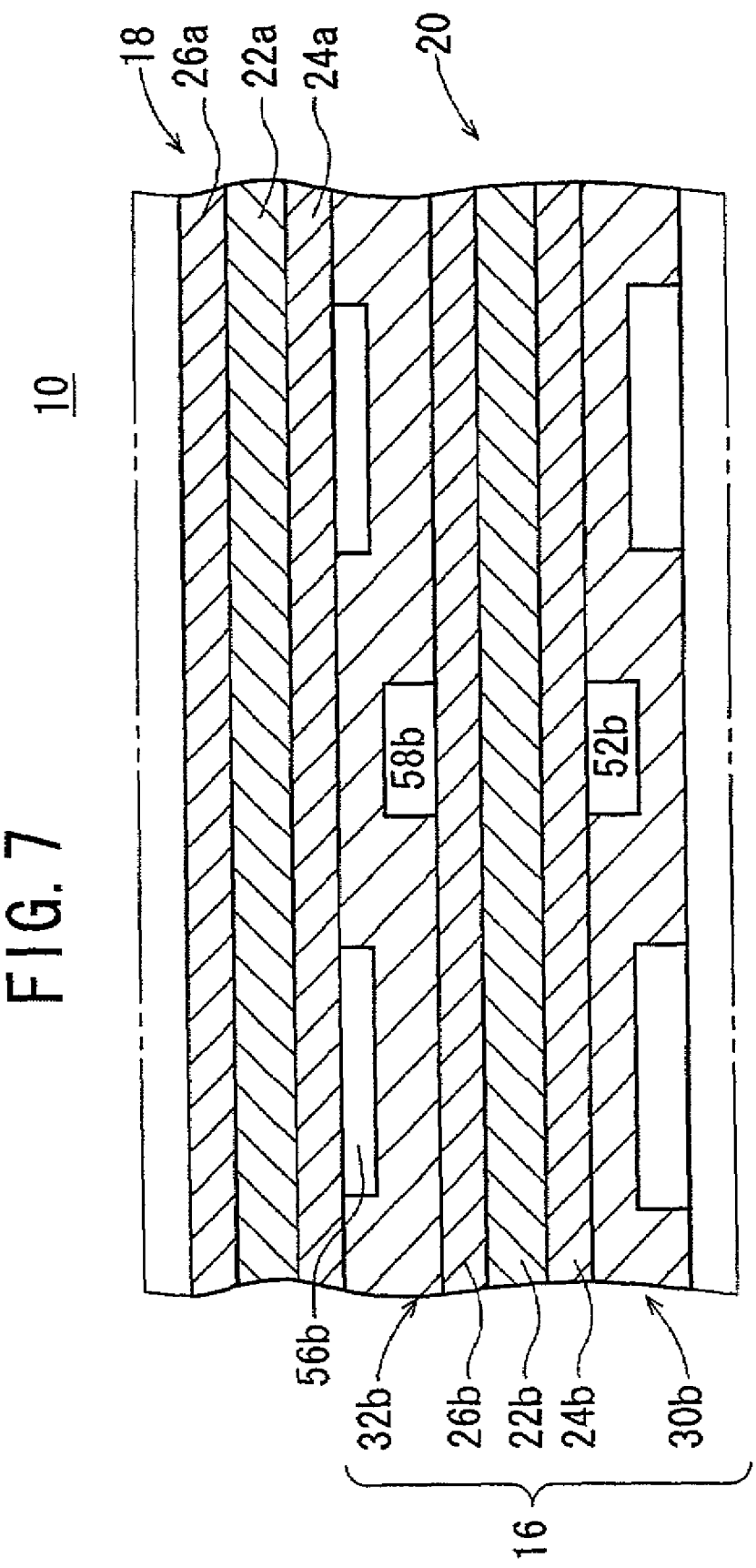
FIG. 7 is a view illustrating a manner of making cross-sections of passages different from each other by making the widths of the passages different from each other.

In an example shown in FIG. 7, the width of each outlet side fuel gas passage 52b formed in a plate-like second separator 30b is smaller than the width of each inlet side fuel gas passage 56b formed in an intermediate separator 32b. With this configuration, it is possible to obtain an additional effect of increasing the contact area between the first and second unit cells 14 and 16, thereby reducing the contact resistance. While not shown, the same is true for the oxidizing gas passages.

Figure 8:
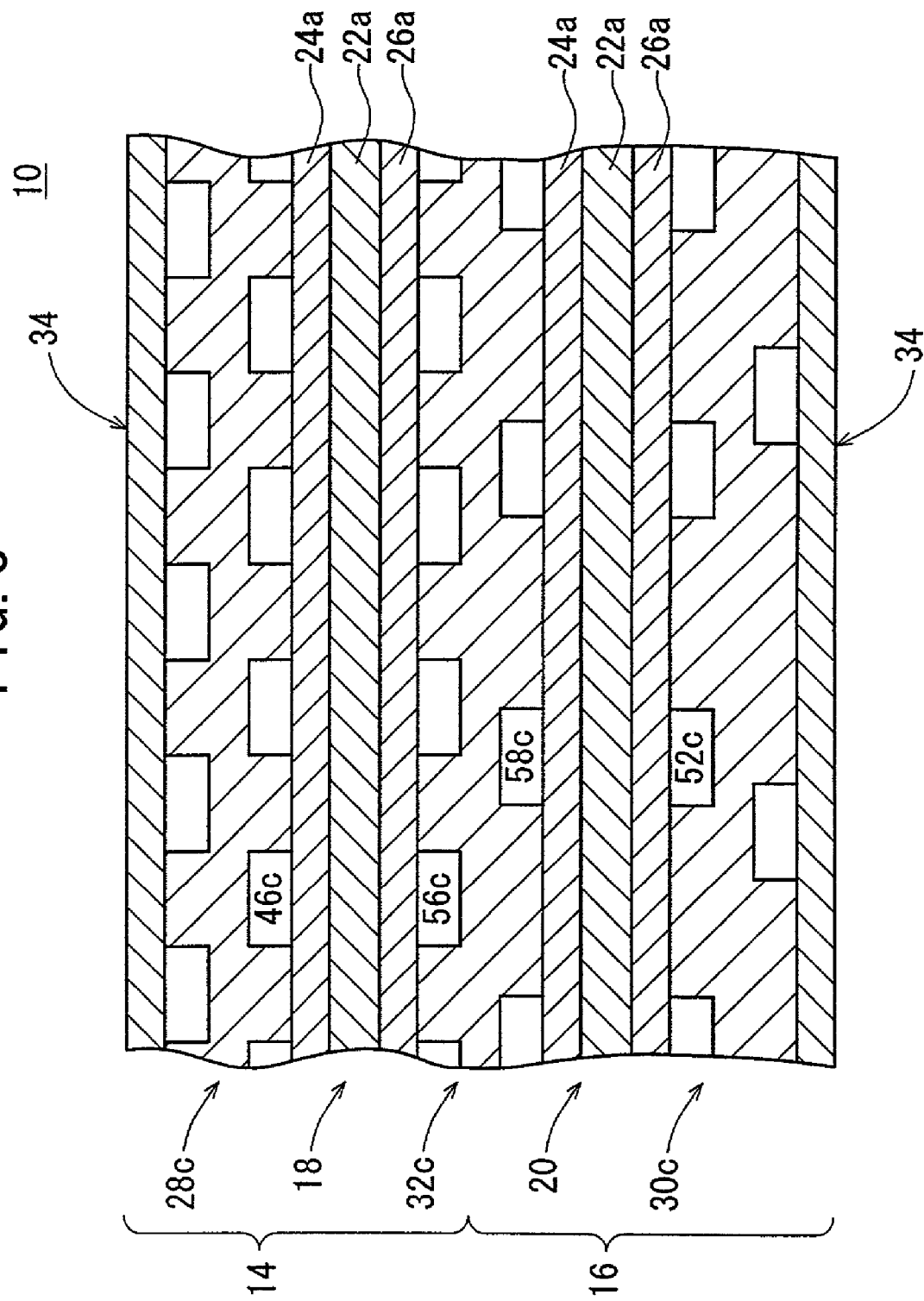
FIG. 8 is a view illustrating a manner of making cross-sections of passages different from each other by making the number of the passages different from each other.

In an example shown in FIG. 8, the number of outlet side oxidizing gas passages 58c provided in a plate-like intermediate separator 32c is smaller than the number of inlet side oxidizing gas passages 46c provided in a plate-like first separator 28c, and similarly, the number of outlet side fuel gas passages 52c provided in a plate-like second separator 30c is smaller than the number of inlet side fuel gas passages 56c provided in the intermediate separator 32c. With this configuration, like the example shown in FIG. 7, it is possible to obtain an additional effect of effectively increasing the contact area between the first and second unit cells 14 and 16.

To improve the drainage characteristics in the first and second unit cells 14 and 16, the gas passage length in the second unit cell 16 on the outlet side may be set to be larger than the gas passage length in the first unit cell 14 on the inlet side. The amount of produced water becomes larger on the outlet side; however, according to the above configuration, since the gas passage length on the outlet side is larger, there occurs a pressure drop on the outlet side, to thereby improve the drainage characteristic of the produced water on the outlet side.

Figure 9:
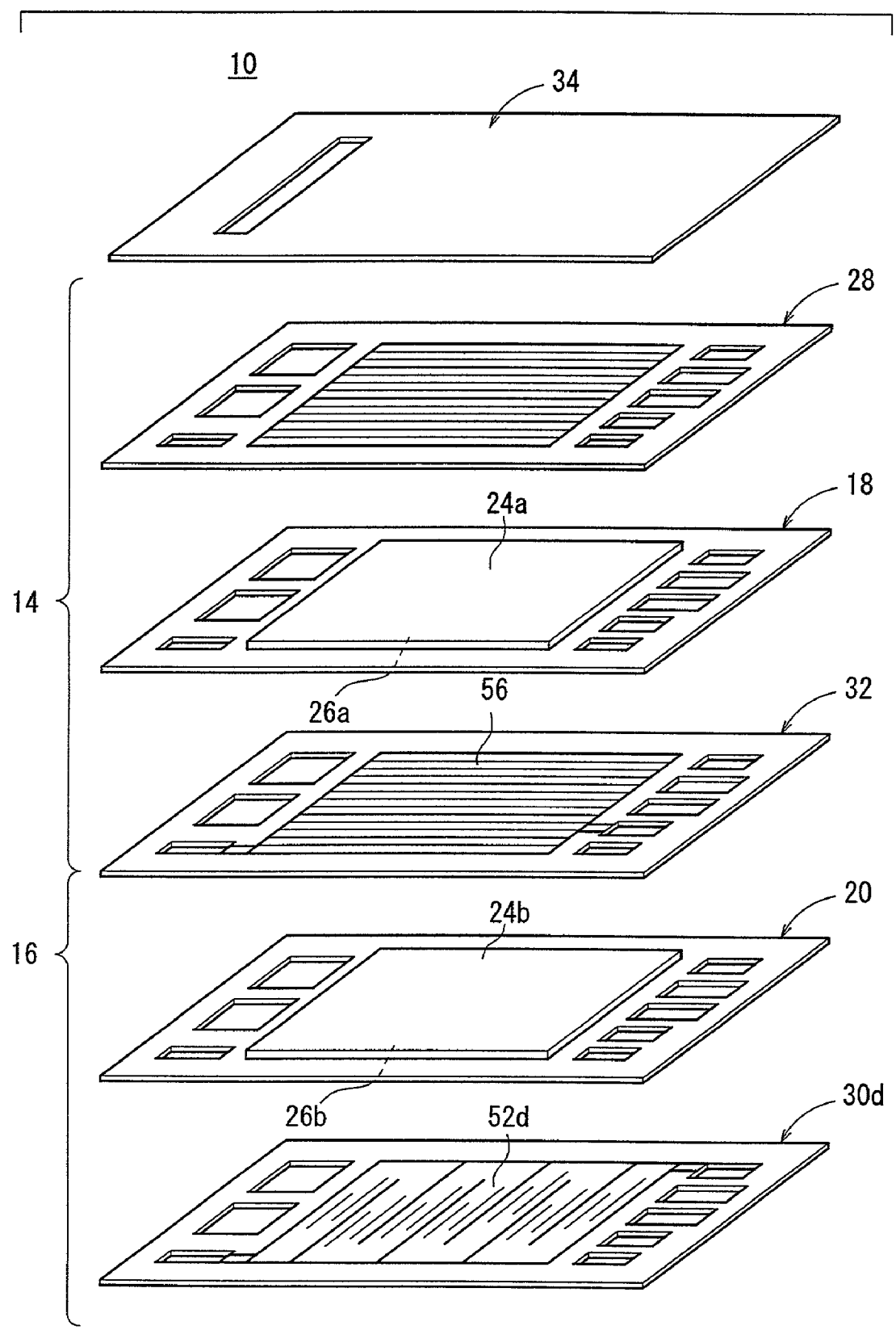
FIG. 9 is an exploded perspective view of the cell assembly in which the passage lengths are changed.

To be more specific, as shown in FIG. 9, linear fuel gas passages 56 are provided in an intermediate separator 32, whereas meandering fuel gas passages 52d are provided in a second separator 30d. As a result, the gas passage length of the fuel gas passages 52d on the outlet side is effectively larger than the gas passage length of the fuel gas passages 56 on the inlet side. In addition, the meandering fuel gas passages 52d may be replaced with bent or curved fuel gas passages.

According to the first embodiment, since the cell assembly 10 is formed of an integral body of a plurality of unit cells, for example, the unit cells 14 and 16, it is possible to effectively simplify the workability at the time of assembly of the fuel cell stack 12 by taking the cell assembly 10 as a handling unit, as compared with the conventional manner of assembling the fuel cell stack by taking each unit cell as a handling unit.

According to the first embodiment, the cell assembly 10 is configured as an integral body of the first and second unit cells 14 and 16 and further at least part of the oxidizing gas passages 46 provided in the first unit cell 14 are communicated in series to at least part of the oxidizing gas passages 58 provided in the second unit cell 16 via the oxidizing gas intermediate communication holes 40, whereas at least part of the fuel gas passages 56 provided in the first unit cell 14 are communicated in series to at least part of the fuel gas passages 52 provided in the second unit cell 16 via the fuel gas intermediate communication holes 38. Accordingly, the flow rate of the oxidizing gas required for the whole reaction in the first and second unit cells 14 and 16 is supplied to the oxidizing gas passages 46 on the inlet side, whereas the flow rate of the fuel gas required for the whole reaction in the first and second unit cells 14 and 16 is supplied to the fuel gas passages 56 on the inlet side. In other words, the flow rate of the oxidizing gas being twice the flow rate generally required for the reaction in one unit cell is supplied to the oxidizing gas passages 46 on the inlet side, whereas the flow rate of the fuel gas being twice the flow rate generally required for the reaction in one unit cell is supplied to the fuel gas passages 56 on the inlet side.

As a result, particularly, drainage characteristics of the oxidizing gas passages 46 and 58 in which water is produced can be improved, so that the humidity in the first unit cell 14 can be equalized to the humidity in the second unit cell 16. As a result, it is possible to equalize the current density distribution in the first unit cell 14 to the current density distribution in the second unit cell 16, and hence to reduce occurrence of concentration overpotential.

Since the oxidizing gas passages 46 in the first unit cell 14 are communicated in series to the oxidizing gas passages 58 in the second unit cell 16, whereas the fuel gas passages 56 in the first unit cell 14 are communicated in series to the fuel gas passages 52 in the second unit cell 16, the flow velocity of the oxidizing gas supplied to the oxidizing gas inlets 36a and also the flow velocity of the fuel gas supplied to the fuel gas inlets 42a become high as compared with the conventional unit cell structure. As a result, it is possible to effectively discharge water produced in the first and second unit cells 14 and 16, and hence to significantly improve the whole drainage characteristic of the cell assembly 10.

A method of operating the cell assembly according to the present invention will be described by using the cell assembly 10 and the fuel cell stack 12. In addition, since the basic steps of the operating method are the same as the above-described operating steps of the cell assembly 10 and the fuel cell stack 12, only characteristics of the operating method will be briefly described below.

According to the operating method of the present invention, the first and second unit cells 14 and 16 are operated in different conditions by using the following first, second, third and fourth processes.

Figure 10:
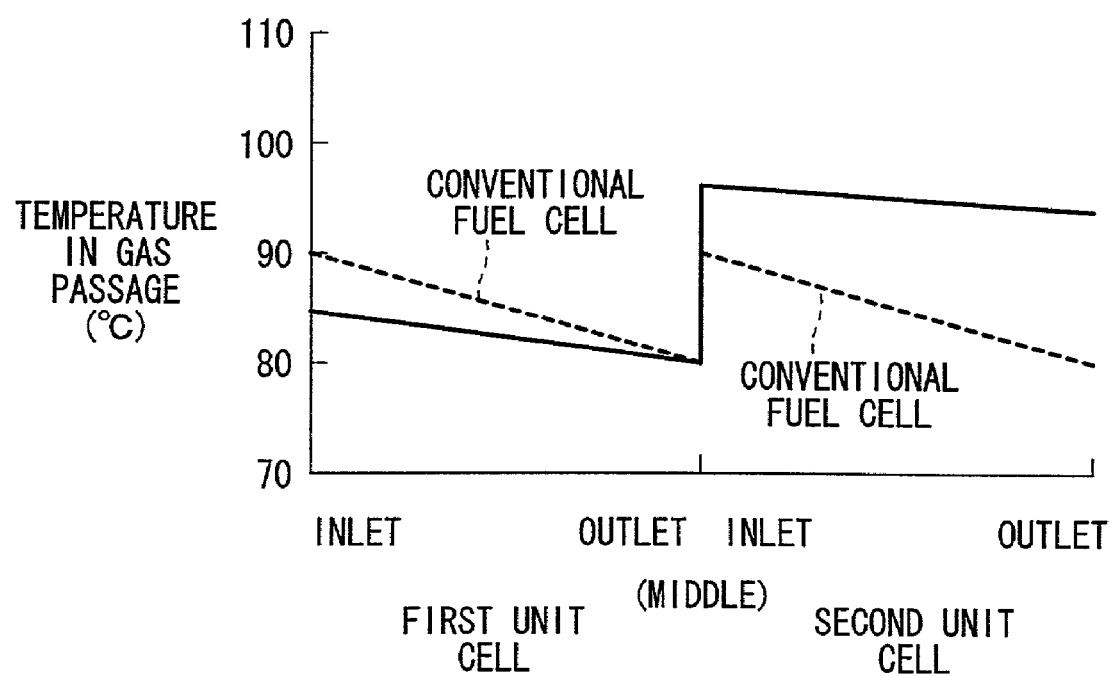
FIG. 10 is a graph illustrating temperatures of cathodes in first and second unit cells.
Figure 11:
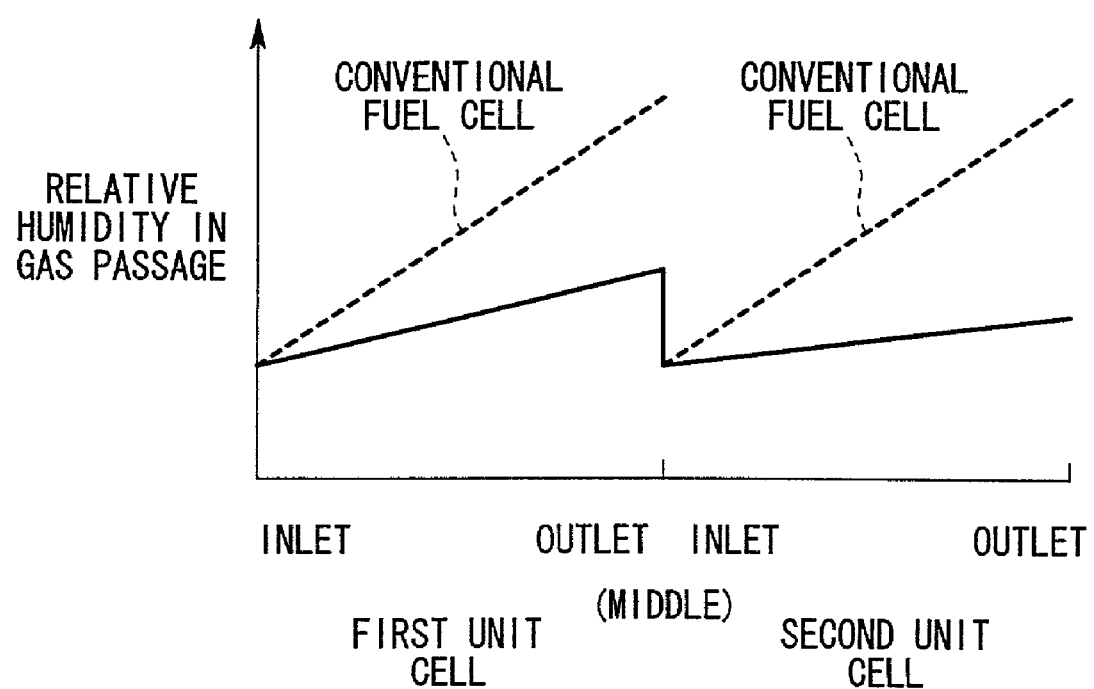
FIG. 11 is a graph illustrating relative humidities of the cathodes in the first and second unit cells.

According to the first process of the present invention, the temperature of the second unit cell 16 on the downstream side is set to be higher than the temperature of the first unit cell 14 on the upstream side. This will be more fully described by example of the cathode electrode 24a in the first unit cell 14 and the cathode electrode 24b in the second unit cell 16. By making the temperature in the gas passages on the second unit cell 16 side higher than the temperature in the gas passages on the first unit cell 14 side as shown in FIG. 10, the relative humidity in the gas passages on the first unit cell 14 and the relative humidity in the gas passages on the second unit cell 16 are reduced as shown in FIG. 11. The reason for this is as follows: namely, on the first unit cell 14 side, since the flow rate of the oxidizing gas required for the whole reaction in the first and second cells 14 and 16 is supplied to the first unit cell 14, a change in humidity is reduced, whereas on the second unit cell 16 side, since the cell temperature is increased, the relative humidity is reduced.

With this configuration, since the relative humidity in the first unit cell 14 can be equalized to the relative humidity in the second unit cell 16, it is possible to improve the ion conductivity of each of the electrolyte membranes 22a and 22b, and hence to reduce the concentration overpotential.

According to the second process of the present invention, the flow velocity of the oxidizing gas flowing in the second unit cell 16 is set to be higher than the flow velocity of the oxidizing gas flowing in the first unit cell 14. As the oxidizing gas flows ahead more to the outlet side, a larger amount of water is produced. Accordingly, by setting the flow velocity of the oxidizing gas flowing in the second unit cell 16 on the downstream side in the flow direction, the drainage characteristic of the produced water can be improved.

According to the third process of the present invention, the humidity at the oxidizing gas inlet (reaction gas inlet) 36a of the second unit cell 16 is set to be lower than the humidity of the oxidizing gas intermediate communication hole (reaction gas outlet) 40 of the first unit cell 14 (see solid lines in FIG. 11).

According to the fourth process of the present invention, the utilization ratio of the reaction gas in the second unit cell 16 is set to be higher than the utilization ratio of the reaction gas in the first unit cell 14. Accordingly, it is possible to improve the total utilization ratio of the cell assembly 10, and hence to effectively reduce the consumed quantity of the reaction gas.

Figure 12:
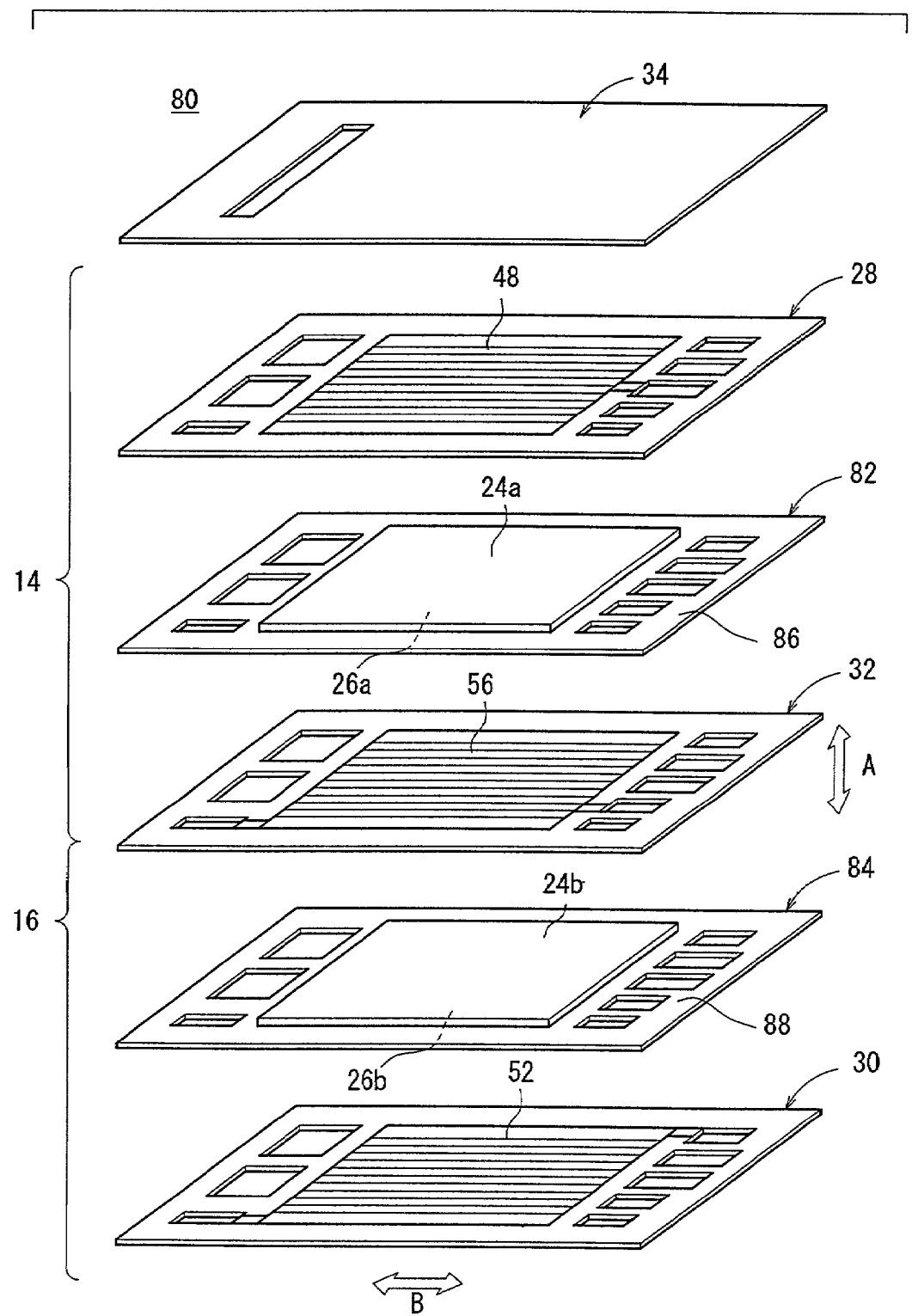
FIG. 12 is an exploded perspective view of an essential portion of a solid polymer electrolyte fuel cell assembly according to a second embodiment of the present invention.

FIG. 12 is an exploded perspective view of an essential portion of a cell assembly 80 according to a second embodiment of the present invention. In the cell assembly 80 of this embodiment, parts corresponding to those in the cell assembly 10 according to the first embodiment are designated by the same reference numerals and the overlapped description thereof is omitted. The same is true for the following third and later embodiments.

The cell assembly 80 includes a first unified body 82 and a second unified body 84. The first unified body 82 has a fluorine based electrolyte membrane 86, and the second unified body 84 has a hydrocarbon based electrolyte membrane 88.

According to the second embodiment configured as described above, to cope with an inconvenience that the temperature of the second unified body 84 on the downstream side in the flow direction of a reaction gas is higher than the temperature of the first unified body 82 on the upstream side in the flow direction of the reaction gas, the hydrocarbon based electrolyte membrane 88 having a high heat resistance is provided in the second unified body 84. With this configuration, the useful life of the second unified body 84 can be improved. As a result, since the second unified body 84 can be used for a long period of time, it is possible to enhance the economical merit of the cell assembly 80.

Figure 13:
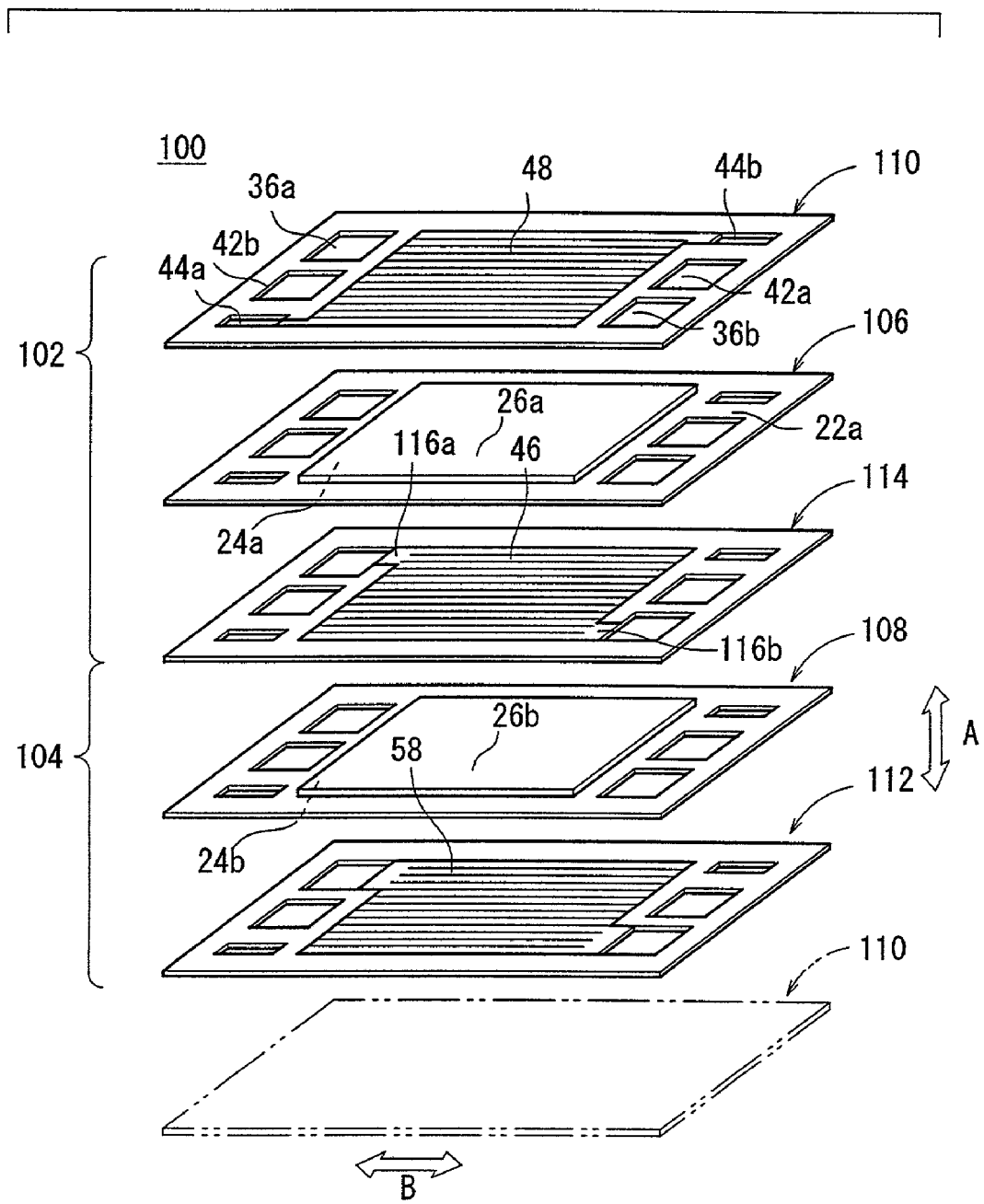
FIG. 13 is an exploded perspective view of an essential portion of a solid polymer electrolyte fuel cell assembly according to a third embodiment of the present invention.

FIG. 13 is an exploded perspective view of an essential portion of a solid polymer electrolyte fuel cell assembly 100 according to a third embodiment of the present invention.

The cell assembly 100 is formed by stacking a first unit cell 102 and a second unit cell 104 to each other in the direction A. The first unit cell 102 includes a first unified body 106, and the second unit cell 104 includes a second unified body 108. The first unified body 106 is held between a first separator 110 and an intermediate separator 114, and the second unified body 108 is held between the intermediate separator 114 and a second separator 112.

Each of the first and second unit cells 102 and 104 has, on the one edge side in the long-side direction, oxidizing gas inlets 36a, fuel gas outlets 42b, and coolant inlets 44a, wherein the oxidizing gas inlets 36a (fuel gas outlets 42b, and coolant inlets 44a) are communicated to each other in the direction A, and also have, on the other edge side in the long-side direction, oxidizing gas outlets 36b, fuel gas inlets 42a, and coolant outlets 44b, wherein the oxidizing gas outlets 36b (fuel gas inlets 42a, and coolant outlets 44b) are communicated to each other in the direction A.

The first separator 110 has, on one surface side, a plurality of coolant passages 48. The coolant passages 48 linearly extend in the direction B, with the one-ends thereof communicated to the coolant inlet 44a and the other ends thereof communicated to the coolant outlet 44b.

Figure 14:
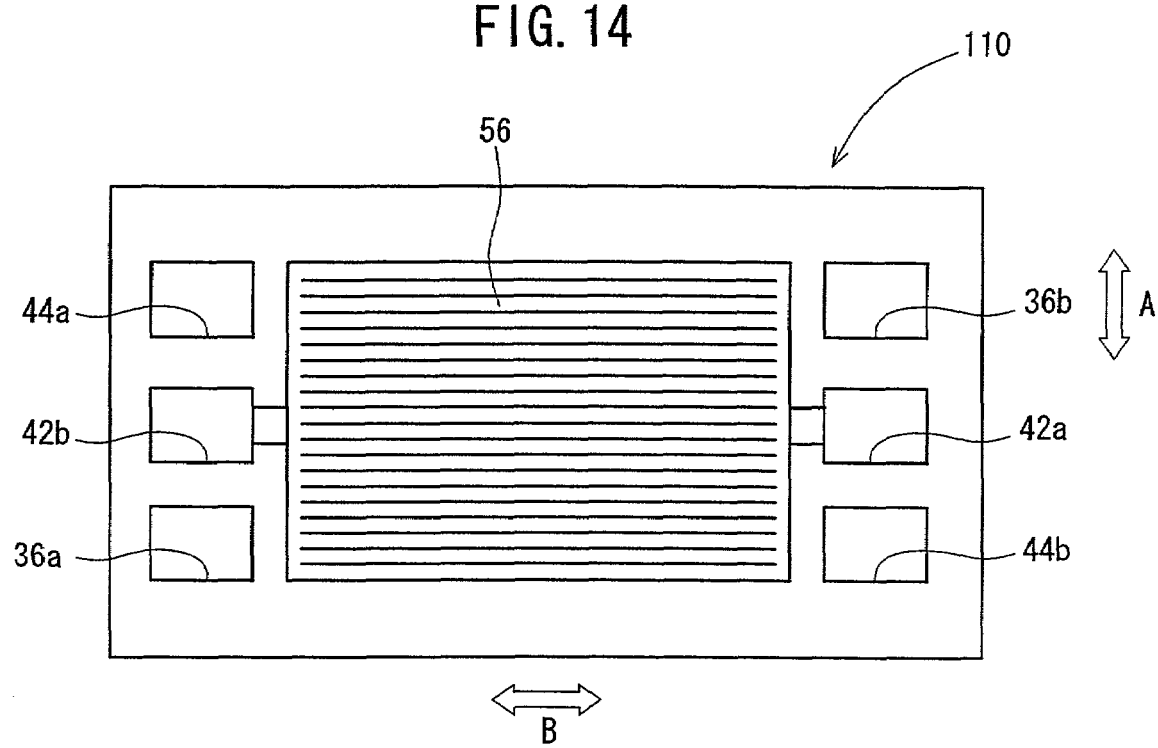
FIG. 14 is a front view of a first separator of the cell assembly.

The first separator 110 has, on the other surface side, a plurality of fuel gas passages 56 as shown in FIG. 14. The fuel gas passages 56 linearly extend in the direction B, with the one-ends thereof communicated to the fuel gas inlet 42a and the other ends thereof communicated to the fuel gas outlet 42b. The depths of the fuel gas passages 56 become shallower toward the fuel gas outlet 42b side.

The second separator 112 has, on the surface side facing to a cathode 24b of the second unified body 108, a plurality of oxidizing gas passages 58 linearly extending in the direction B. The one-ends of the oxidizing gas passages 58 are communicated to the oxidizing gas inlet 36a and the other ends thereof are communicated to the oxidizing gas outlet 36b.

Figure 15:
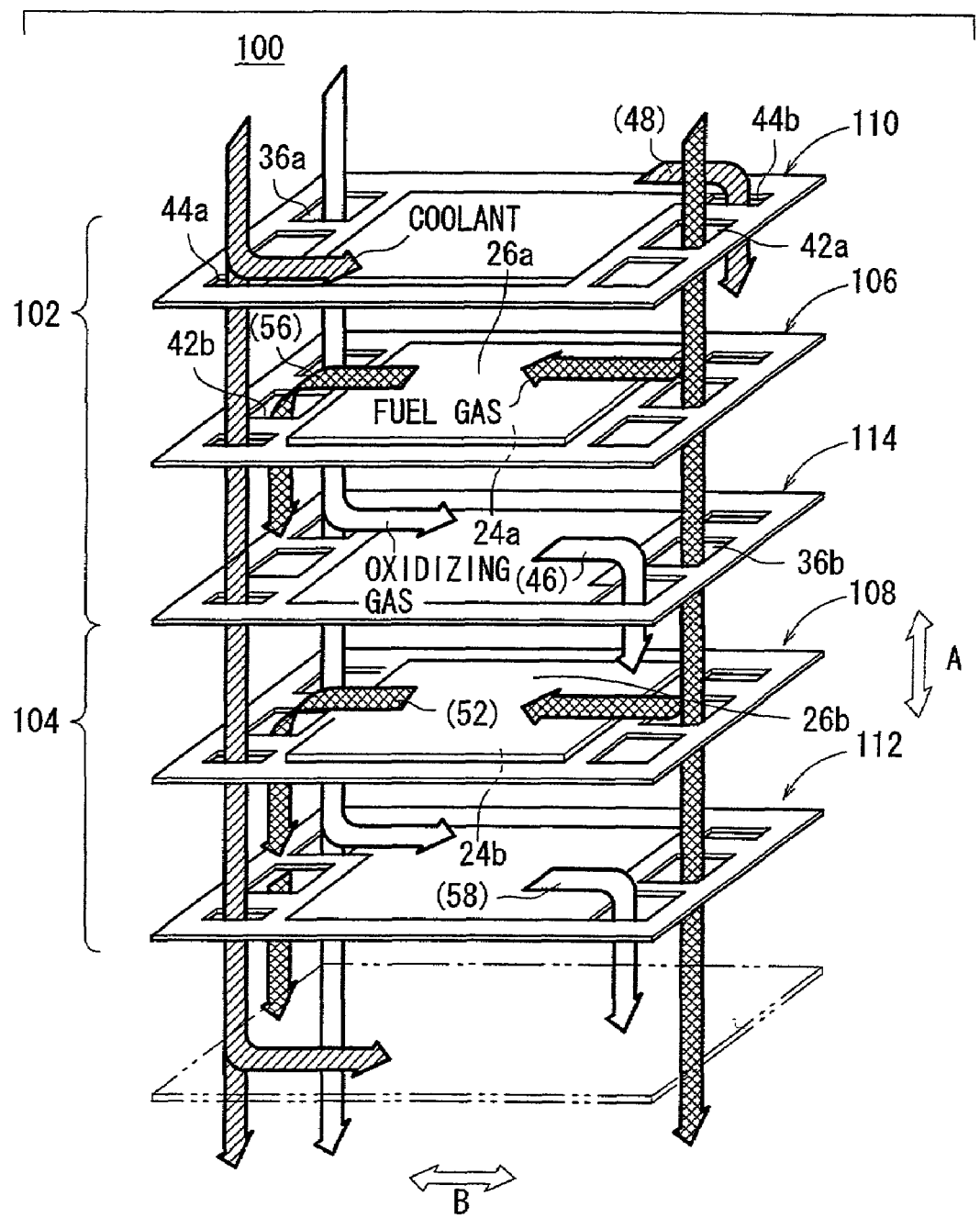
FIG. 15 is a view showing flows of an oxidizing gas, a fuel gas, and a coolant in the cell assembly according to the third embodiment.

The intermediate separator 114 has, on the surface side facing to a cathode 24a of the first unified body 106, oxidizing gas passages 46 extending in the direction B. The one-ends of the oxidizing gas passages 46 are communicated to the oxidizing gas inlet 36a and the other ends thereof are communicated to the oxidizing gas outlets 36b. A portion, communicated to the oxidizing gas inlet 36a, of the oxidizing gas passages 46 is choked, to form a choked portion 116a, whereas a portion, communicated to the oxidizing gas outlet 36b, of the oxidizing gas passages 46 is choked, to form a choked portion 116b. Like the first separator 110, the intermediate separator 114 has, on the surface side facing to an anode 26b of the second unified body 108, fuel gas passages 52 (see FIG. 15).

According to the cell assembly 100 configured as described above, the coolant passages 48 are formed on the surface side, opposed to the side provided with the oxidizing gas passages 58, of the second separator 112, so that the oxidizing gas passages 58 of the second separator 112 are cooled by the coolant, to be kept at a low temperature. On the other hand, the oxidizing gas passages 46 of the intermediate separator 114 is less cooled, to be kept at a high temperature. As a result, there occurs a difference in temperature environment between the first and second unit cells 102 and 104. In this case, water is liable to be produced in the oxidizing gas passages 58 in the second separator 112 on the low temperature side to be accumulated in the passages, gas diffusion layers, or catalyst layers, tending to block the oxidizing gas passages 58.

To cope with such an inconvenience, according to the third embodiment, there is adopted the structure for increasing the flow rate in the oxidizing gas passages 58 of the second separator 112 thereby equalizing the humidity in the second unit cell 104 to the humidity in the first unit cell 102, and increasing the flow velocity in the oxidizing gas passages 58 of the second separator 112 thereby improving the drainage characteristic of produced water. That is to say, the choked portions 116a and 116b are respectively provided at the portions, communicated to the oxidizing gas inlet 36a and the oxidizing gas outlet 36b, of the oxidizing gas passages 46 of the intermediate separator 114 on the high temperature side (see FIG. 13). Accordingly, the flow rate of the oxidizing gas in the oxidizing gas passages 58 of the second separator 112 becomes larger than the flow rate of the oxidizing gas in the oxidizing gas passages 46 of the intermediate separator 114.

As a result, according to the third embodiment, since water produced in the second separator 112 on the low temperature side can be positively discharged, it is possible to equalize the humidity in the second unit cell 104 to the humidity in the first unit cell 102. Further, since the flow rate and the flow velocity of the oxidizing gas flowing in the intermediate separator 114 on the high temperature side are reduced, it is possible to prevent drying of the first unified body 106.

According to the third embodiment, the choked portions 116a and 116b are provided on both the sides of the oxidizing gas passages 46 on the high temperature side; however, the same effect can be easily obtained by making the depths of the oxidizing gas passages 58 on the low temperature side shallower than the depths of the oxidizing gas passages 46 on the high temperature side.

Figure 16:
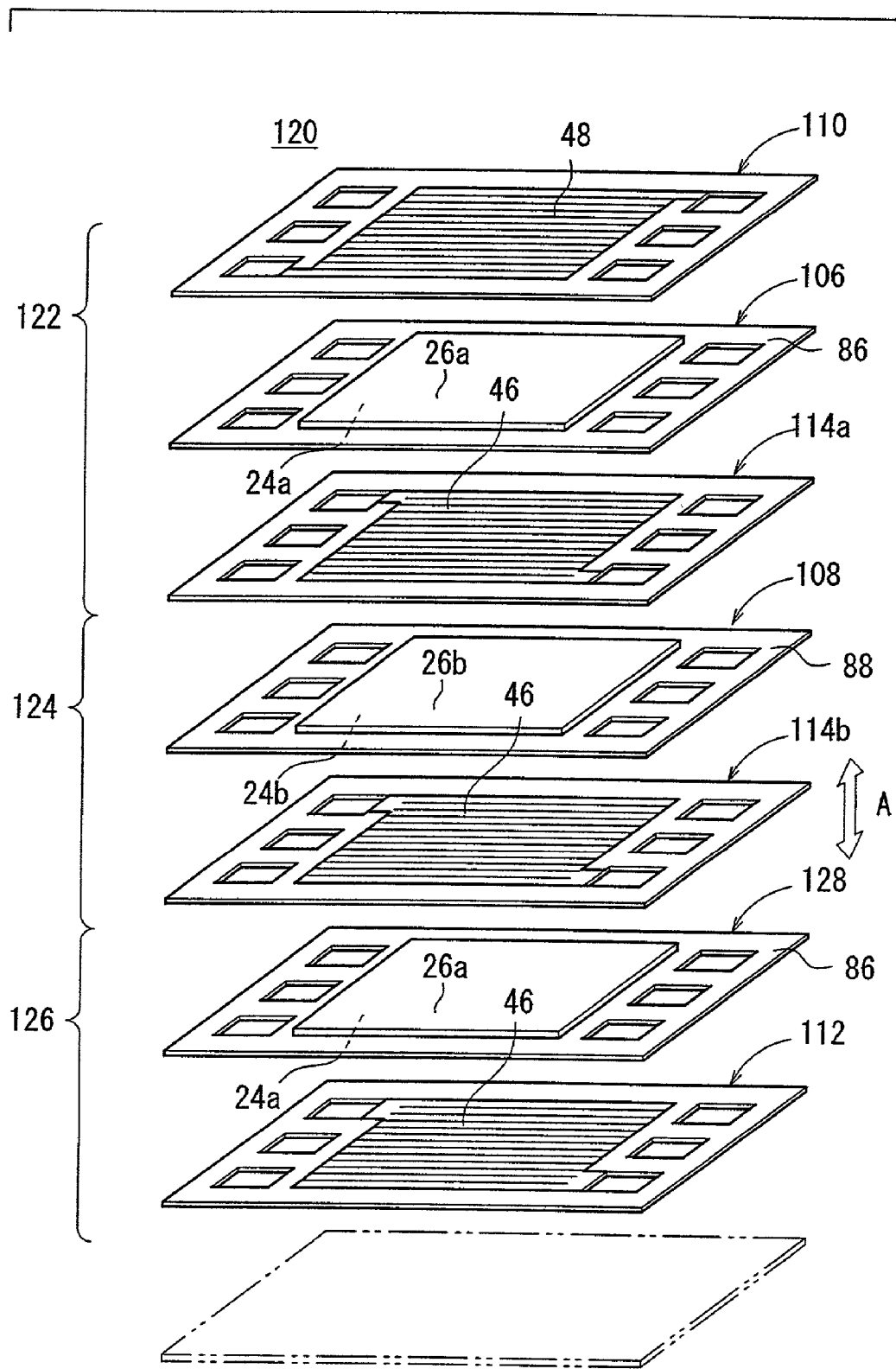
FIG. 16 is an exploded perspective view of an essential portion of a solid polymer electrolyte fuel cell assembly according to a fourth embodiment of the present invention.

FIG. 16 is an exploded perspective view of an essential portion of a solid polymer electrolyte fuel cell assembly 120 according to a fourth embodiment of the present invention. In the cell assembly 120 of this embodiment, parts corresponding to those in the cell assembly 100 according to the third embodiment are designated by the same reference numerals and the overlapped description thereof is omitted.

The cell assembly 120 is formed by stacking a first unit cell 122, a second unit cell 124, and a third unit cell 126 to each other in the direction A. The first unit cell 122 has a first unified body 106; the second unit cell 124 has a second unified body 108; and the third unit cell 126 has a third unified body 128. The first unified body 106 is held between a first separator 110 and a first intermediate separator 114a; the second unified body 108 is held between the first intermediate separator 114a and a second intermediate separator 114b; and the third unified body 128 is held between the second intermediate separator 114b and a second separator 112.

In the cell assembly 120, there occur differences in temperature environment among the first, second and third unit cells 122, 124 and 126. In particular, the temperature of the second unified body 108 tends to be higher than that of each of the first and third unified bodies 106 and 128.

To cope with such an inconvenience, according to this embodiment, each of the first and third unified bodies 106 and 128 kept at a relatively low temperature includes a fluorine based electrolyte membrane 86 stable in a low temperature range, and the second unified body 108 kept at a relatively high temperature includes a hydrocarbon based electrolyte membrane 88 withstanding a high temperature. Further, since each of the first and third unified bodies 106 and 128 becomes high in humidity, it includes a catalyst layer and a gas diffusion layer, each of which is excellent in drainage characteristic, whereas since the second unified body 108 becomes low in humidity, it includes a self-humidifying membrane and a gas diffusion layer having a high water-retention property.

The cell assembly 120 configured as described above has an effect of improving the performances so as to keep up with different temperature environments by using different kinds of the first, second, and third unified bodies 106, 108, and 128.

Figure 17:
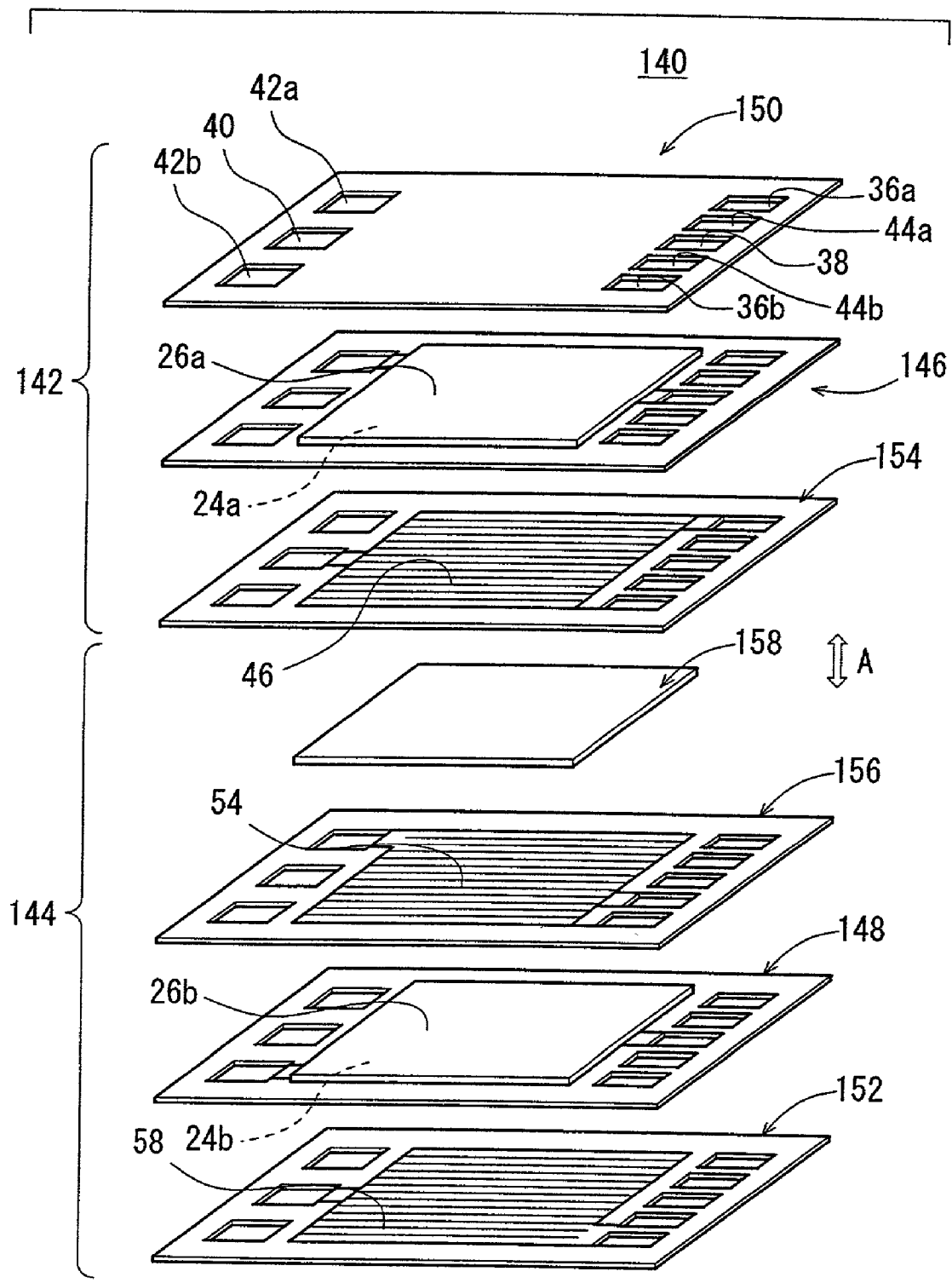
FIG. 17 is an exploded perspective view of an essential portion of a solid polymer electrolyte fuel cell assembly according to a fifth embodiment of the present invention.

FIG. 17 is an exploded perspective view of an essential portion of a solid polymer electrolyte fuel cell assembly 140 according to a fifth embodiment of the present invention.

The cell assembly 140 is configured by stacking a first unit cell 142 and a second unit cell 144 to each other. The first unit cell 142 has a first unified body 146, and the second unit cell 144 has a second unified body 148. The first unified body 146 is held between a first separator 150 and a first intermediate separator 154, and the second unified body 148 is held between a second intermediate separator 156 and a second separator 152. A flat baffle plate 158 is interposed between the first and second intermediate separators 154 and 156.

The cell assembly 140 has, on the one edge side in the long-side direction, fuel gas inlets 42a, oxidizing gas intermediate communication holes 40, and fuel gas outlets 42b, wherein the fuel gas inlets 42a (oxidizing gas intermediate communication holes 40, and fuel gas outlets 42b) are communicated to each other in the direction A, and also has, on the other edge side in the long-side direction, oxidizing gas inlets 36a, coolant inlets 44a, fuel gas intermediate communication holes 38, coolant outlets 44b, and oxidizing gas outlets 36b, wherein the oxidizing gas inlets 36a (coolant inlets 44a, fuel gas intermediate communication holes 38, coolant outlets 44b, and oxidizing gas outlets 36b) are communicated to each other in the direction A.

Each of the first and second intermediate separators 154 and 156 has, on the surface side facing to the baffle plate 158, coolant passages 54 which extend linearly. The one-ends of the coolant passages 54 formed in the first intermediate separator 154 are communicated to the coolant inlet 44a of the first intermediate separator 154 and the other ends thereof are returned on the baffle plate 158 and are communicated to the coolant passages 54 formed in the second intermediate separator 156. The coolant passages 54 formed in the second intermediate separator 156 are communicated to the coolant outlet 44b of the second intermediate separator 156.

Figure 18:
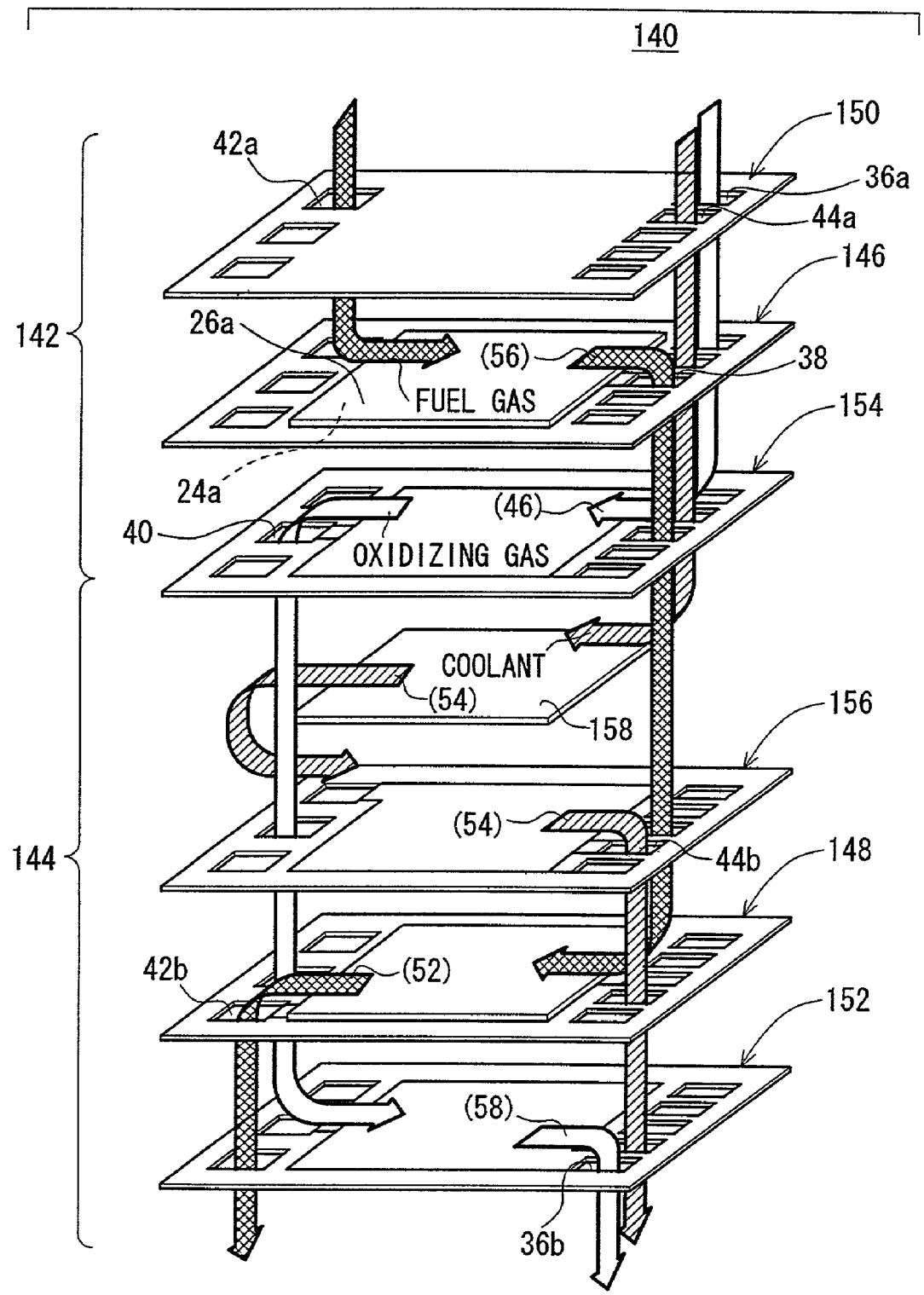
FIG. 18 is a view showing flows of an oxidizing gas, a fuel gas, and a coolant in the cell assembly according to the fifth embodiment of the present invention.

In the cell assembly 140 configured as described above, an oxidizing gas, a fuel gas, and a coolant are respectively supplied in series to the first and second unit cells 142 and 144 along the flow direction shown in FIG. 18. In this case, since the coolant passages 54 are formed between the first and second unit cells 142 and 144 via the baffle plate 158, it is possible to positively prevent the temperature, particularly, of the interior of the cell assembly 140 from being excessively raised.

Figure 19:
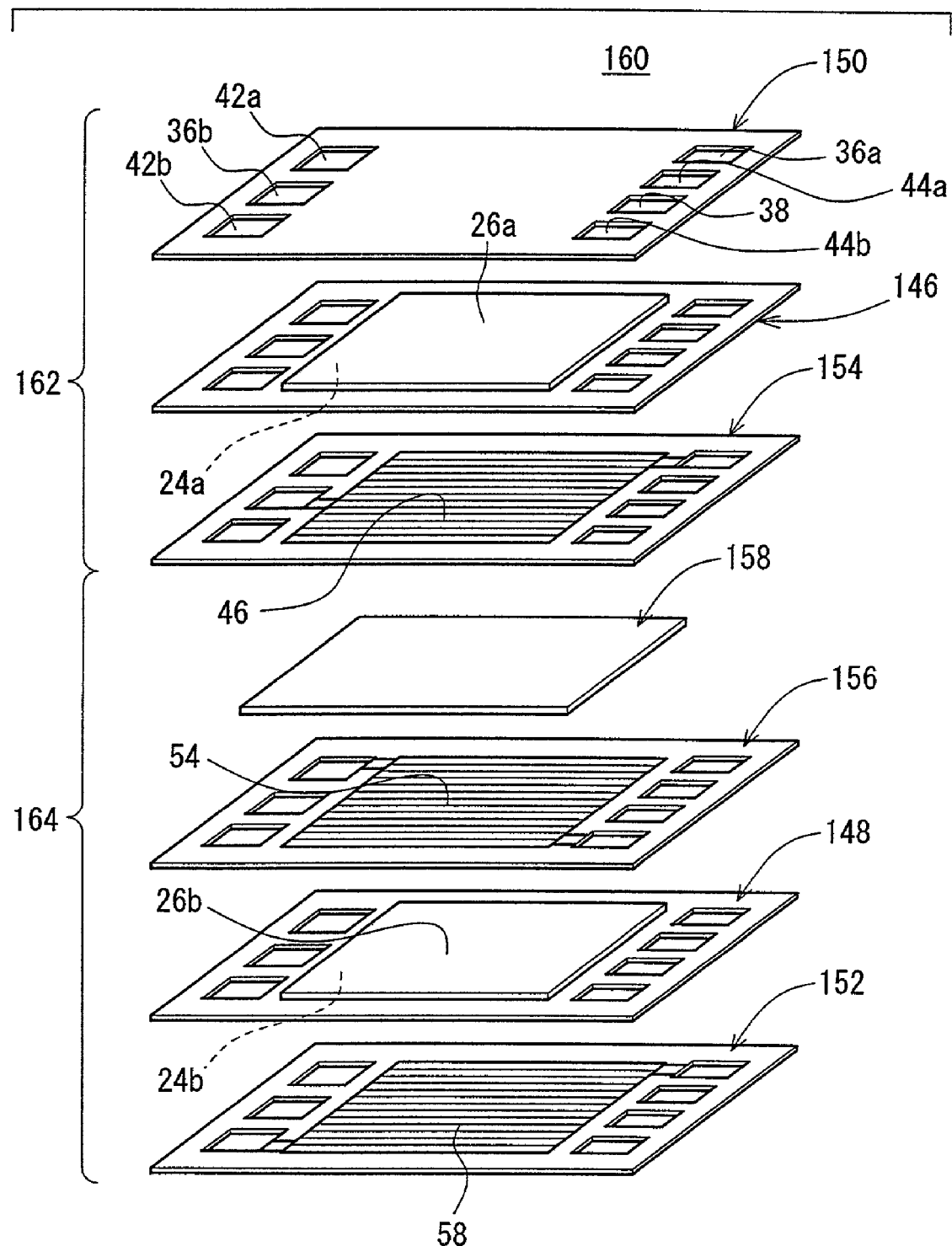
FIG. 19 is an exploded perspective view of an essential portion of a solid polymer electrolyte fuel cell assembly according to a sixth embodiment of the present invention.

FIG. 19 is an exploded perspective view of an essential portion of a solid polymer electrolyte fuel cell assembly 160 according to a sixth embodiment of the present invention. In the cell assembly 160 of this embodiment, parts corresponding to those in the cell assembly 140 according to the fifth embodiment shown in FIG. 17 are designated by the same reference numerals and the overlapped description thereof is omitted.

Figure 20:
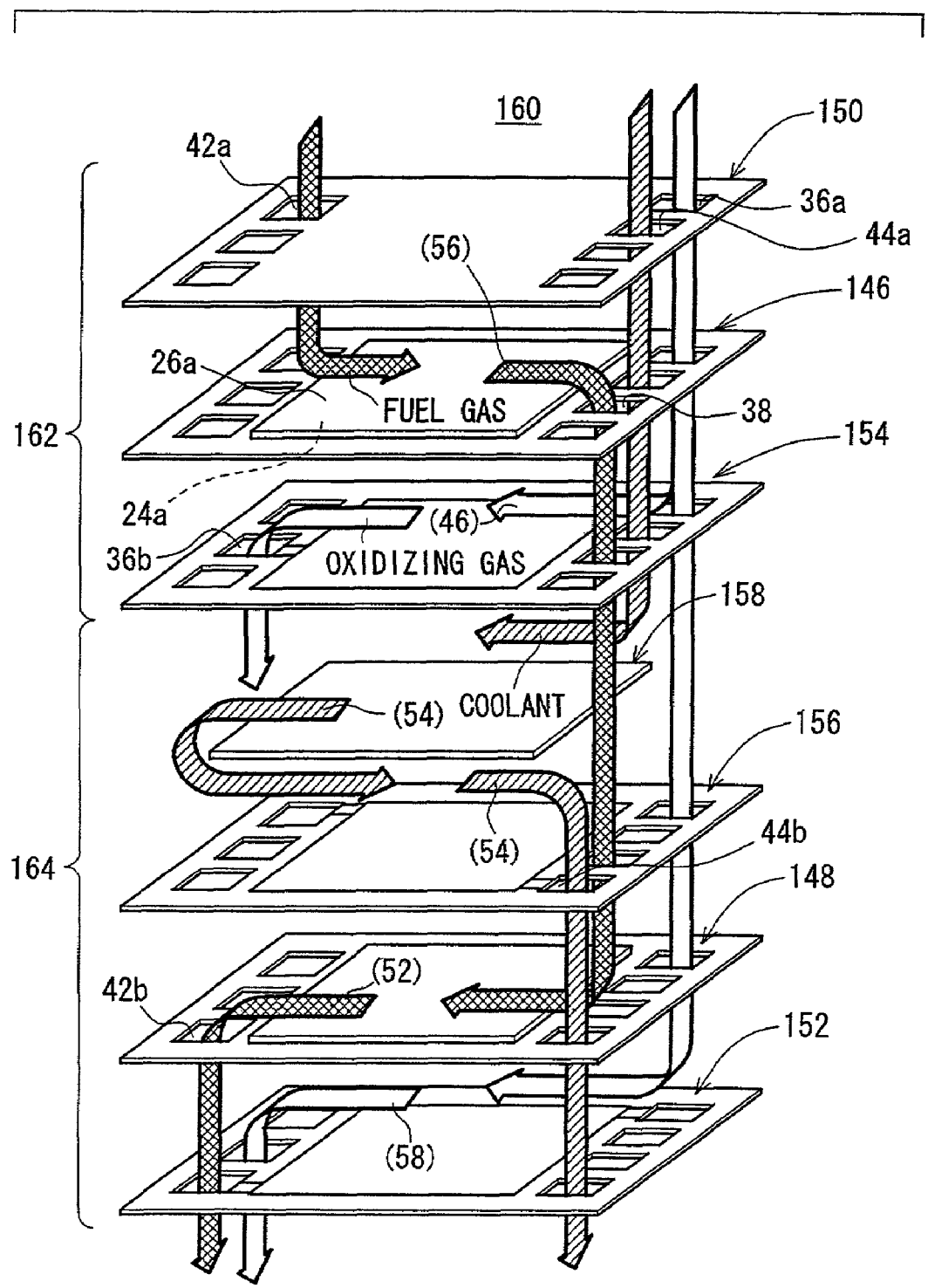
FIG. 20 is a view showing flows of an oxidizing gas, a fuel gas, and a coolant in the cell assembly according to the sixth embodiment of the present invention.

The cell assembly 160 is formed by stacking a first unit cell 162 and a second unit cell 164 to each other in the direction A, and is not provided with the oxidizing gas intermediate holes 40 provided in the fifth embodiment. Accordingly, in the cell assembly 160, as shown in FIG. 20, a fuel gas flows along fuel gas passages 56 and 52 which are provided in the first and second unit cells 162 and 164 in such a manner as to be communicated in series to each other, whereas an oxidizing gas flows individually, that is, in parallel into oxidizing gas passages 46 and 58 provided in the first and second unit cells 162 and 164.

According to this embodiment, since the fuel gas having a low viscosity flows along the fuel gas passages 56 and 52 communicated in series to each other, the whole length of the fuel gas passages becomes larger, to thereby give a sufficient pressure drop, with a result that produced water can be effectively discharged from anodes 26a and 26b.

Although certain preferred embodiments of the present invention have been shown and described in detail, it should be understood that various changes and modifications may be made therein without departing from the scope of the appended claims.

What is claimed is:

1. A solid polymer electrolyte fuel cell assembly, comprising a plurality of unit cells stacked to each other, the unit cells each having a unified body including an anode, a cathode, and a solid polymer electrolyte membrane disposed between said anode and said cathode, said fuel cell assembly further comprising:

fuel gas inlet holes and fuel gas outlet holes penetrating through said unit cells in the stacking direction; and fuel gas passages connected to said fuel gas inlet holes and said fuel gas outlet holes and formed along a reaction surface of said solid polymer electrolyte membrane, wherein a cross-sectional area in the stacking direction of said fuel gas passages of one unit cell is substantially different than a cross-sectional area in the stacking direction of said fuel gas passages of an adjacent unit cell, and wherein the size of said inlet holes of the one unit cell is substantially the same as the size of said inlet holes of the adjacent unit cell, and the size of said outlet holes of the one unit cell is substantially the same as the size of said outlet holes of the adjacent unit cell.

2. A solid polymer electrolyte fuel cell assembly according to claim 1, wherein the cross-sectional area of said fuel gas passages is different from each other by making at least one of the depths, the widths, and the number of grooves of said fuel gas passages of said one of said unit cells different from the depths, the widths, and the number of grooves of said fuel gas passages of said other of said unit cells.

3. A solid polymer electrolyte fuel cell assembly according to claim 1, wherein in said cell assembly, reaction gas passages for allowing at least one of a fuel gas and an oxidizing gas as reaction gases to flow in said plurality of unit cells therethrough are provided in such a manner that at least portions thereof are communicated in series to each other among the unit cells.

4. A solid polymer electrolyte fuel cell assembly according to claim 1, wherein lengths of fuel gas passages of one unit cell are different from lengths of fuel gas passages of an adjacent unit cell.

5. A solid polymer electrolyte fuel cell assembly according to claim 1, wherein shapes of fuel gas passages of one unit cell are different from shapes of fuel gas passages of an adjacent unit cell.

6. A solid polymer electrolyte fuel cell assembly according to claim 1, wherein the fuel gas passages of one unit cell are substantially of different sizes from oxidizing gas passages of the same unit cell.

7. A fuel cell stack comprising, a plurality of cell assemblies stacked to each other,
- wherein each of said plurality of cell assemblies includes a plurality of unit cells stacked to each other, and each of said plurality of unit cells has a unified body including an anode, a cathode, and a solid polymer electrolyte membrane between said anode and said cathode, said fuel cell assembly further comprising:
- fuel gas inlet holes and fuel gas outlet holes penetrating through said unit cells in the stacking direction; and
- fuel gas passages connected to said fuel gas inlet holes and said fuel gas outlet holes and formed along a reaction surface of said solid polymer electrolyte membrane,
- wherein a cross-sectional area in the stacking direction of said fuel gas passages of one unit cell is substantially different than a cross-sectional area in the stacking direction of said fuel gas passages of an adjacent unit cell, and
- wherein the size of said inlet holes of the one unit cell is substantially the same as the size of said inlet holes of the adjacent unit cell, and the size of said outlet holes of the one unit cell is substantially the same as the size of said outlet holes of the adjacent unit cell.

8. The fuel cell stack of claim 7, wherein the fuel gas passages of one unit cell are substantially of different sizes from oxidizing gas passages of the same unit cell.

* * * * *